United States Patent [19]
Seino

[11] Patent Number: 6,108,023
[45] Date of Patent: *Aug. 22, 2000

[54] IMAGE FORMING APPARATUS USING PLURAL LASER BEAMS

[75] Inventor: Yuzo Seino, Kawasaki, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/497,419

[22] Filed: Jun. 30, 1995

[30] Foreign Application Priority Data

Jul. 11, 1994 [JP] Japan .................................. 6-181839

[51] Int. Cl.$^7$ .................................................. B41J 2/435
[52] U.S. Cl. ............................................................ 347/236
[58] Field of Search ................................... 347/235, 236, 347/246, 250; 250/578.1; 359/233

[56] References Cited

U.S. PATENT DOCUMENTS

| | | | |
|---|---|---|---|
| 3,590,150 | 6/1971 | McMahon | 178/6.7 |
| 4,059,833 | 11/1977 | Kitamura et al. | 346/108 |
| 4,175,851 | 11/1979 | Kitamura et al. | 355/14 R |
| 4,222,643 | 9/1980 | Kitamura et al. | 354/7 |
| 4,232,954 | 11/1980 | Kitamura et al. | 354/7 |
| 4,423,426 | 12/1983 | Kitamura | 346/108 |
| 4,450,453 | 5/1984 | Kitamura et al. | 346/108 |
| 4,542,392 | 9/1985 | Schulz-Hennig | 346/160 |
| 4,804,975 | 2/1989 | Yip | 346/76 L |
| 4,998,118 | 3/1991 | Ng | 346/107 |
| 5,006,705 | 4/1991 | Saito et al. | 250/235 |
| 5,095,315 | 3/1992 | Takeyama | 346/108 |
| 5,107,280 | 4/1992 | Ohashi et al. | 346/108 |
| 5,302,944 | 4/1994 | Curtis | 340/643 |
| 5,477,330 | 12/1995 | Dorr | 358/296 |
| 5,517,230 | 5/1996 | Lofthus et al. | 347/235 |
| 5,521,748 | 5/1996 | Sarraf | 359/321 |
| 5,570,195 | 10/1996 | Honbo | 358/502 |
| 5,589,870 | 12/1996 | Curry et al. | 347/233 |
| 5,617,132 | 4/1997 | Fisli | 347/235 |
| 5,631,762 | 5/1997 | Kataoka | 359/204 |
| 5,774,248 | 6/1998 | Komatsu | 359/204 |
| 5,880,765 | 3/1999 | Ueda et al. | 347/234 |

FOREIGN PATENT DOCUMENTS

| | | |
|---|---|---|
| 51-89347 | 8/1976 | Japan . |
| 62-59506 | 12/1987 | Japan . |
| 63-28304 | 6/1988 | Japan . |

*Primary Examiner*—Eddie C. Lee
*Assistant Examiner*—Christopher Mahoney
*Attorney, Agent, or Firm*—Fitzpatrick, Cella, Harper & Scinto

[57] ABSTRACT

An image forming apparatus for simultaneously scanning a record medium by a plurality of laser beams includes a beam detector capable of simultaneously detecting all of the scanning laser spots, a position detector for detecting the arrival of the laser spots at a predetermined position in response to an output signal of said beam detector, and a distributor for distributing the beam position detection signal outputted by said position detector. The initiation of recording of the laser beams is controlled by the distributed beam position detection signal.

23 Claims, 21 Drawing Sheets

IMAGE FORMING APPARATUS USING PLURAL LASER BEAMS

BACKGROUND OF THE INVENTION

1. Field of the Invention

The present invention relates to an image forming apparatus such as a printer, a copying apparatus or a facsimile apparatus which forms an image by scanning a record medium by a laser beam.

2. Related Background Art

As a high speed image forming apparatus, an apparatus which simultaneously scans a record medium by a plurality of laser beams modulated by respective information signals has been proposed and disclosed in Japanese Patent Publication No. 62-59506 and Japanese Patent Publication No. 63-28304. This apparatus is explained below in conjunction with FIGS. 17 and 18. A light source unit 9 is a semiconductor laser diode array comprising a plurality of laser light sources. Center light beams ha, hb, hc and hd are emitted from light output units 9a, 9b, 9c and 9d of the light source unit 9 in parallel to an optical axis g of a focusing lens 1401. The center light beams pass through the optical axis of the focusing lens 1401 and a cylindrical lens 1402 and reach a deflection mirror plane of a rotating polygon mirror 1403. The light beams reflected by the deflection mirror plane of the rotating polygon mirror 1403 are focused onto a surface of a record medium 15 by an anamofic scan lens system comprising a spherical lens 1404 or a torric lens 1405 to form an image. A reflection mirror 1406 is arranged at an end of the scan line to guide the light beams to a light receiving device 101 (photo detector).

A light shielding plate 110 is arranged in front of the light receiving device 101. The light shielding plate 110 is provided to exactly detect the position of the beam. When the light beam reflected by the reflection mirror 1406 intercepts an edge of the light shielding plate 110, the intercepted light is irradiated to the light receiving device 101 which outputs an electrical signal in accordance with an irradiation intensity.

As shown in FIG. 19, when the laser spots radiated on the record medium have the same light intensity distribution and are at non-right angles with a main scan direction and photo-sensing apertures of the light receiving device 101 have a size to sense all beam spots simultaneously, the light receiving device 101 produces the output signal as shown in (a) of FIG. 20.

In FIG. 20, T1, T2, T3 and T4 of the output signals of the beam detector 1 represent incident times of the beam spots B1, B2, B3 and B4 to the light receiving device 101, and T4 and T5 represent times at which all beams B1, B2, B3 and B4 are irradiated to the photo-sensing device 101. T5, T6, T7 and T8 represent times at which the beams B1, B2, B3 and B4 sequentially move off the light receiving device 101. After T8, no light is irradiated to the light receiving device 101.

The output signal of the light receiving device 101 is amplified by an amplifier, not shown, and compared with a predetermined slice level set by a reference voltage circuit 12 (FIG. 17) by a comparator 11. The comparator 11 produces a detection signal which rises at the rise timing T1 of the beam B1 first applied to the light receiving device 101 and falls at the fall timing T8 of the beam B4 lastly moved off the light receiving device 101. The detection signal is applied to a timing signal generation circuit 13 which generates position signals corresponding to the beam spots B1–B4 at a proper timing. A detail of the timing signal generation circuit 13 is explained in conjunction with FIG. 21.

An output signal of the comparator 11 is used as a clear signal of a counter 1302 and the counter 1302 counts only when the detection signal is of H level. The counter 1302 counts a clock of an oscillation circuit 1301. A frequency of the oscillation circuit should be higher than an image recording clock frequency. As to the reduction of jitter due to the high frequency of the oscillation circuit 1301, reference is made to Japanese Laid-open Patent Application No. 51-89347, for example.

A timing signal (t) indicating the arrival of the first incident beam spot B1 at a predetermined position is generated by an R-S flip-flop (hereinafter referred to as FF). When the detection signal outputted from the comparator 11 is H level, the output of the R-S FF 1311 is H level. Simultaneously therewith, the counter 1302 starts to count the clock from the oscillation circuit 1301.

The output of the counter 1302 is multiple bit parallel output and it is inputted to data comparators 1304–1310. Compare inputs of the data comparators 1304–1310 have been preset by a group of switches 1303 such that a value M is inputted to the data comparator 1304 and a value N is inputted to the data comparator 1305. Thus, when the preset value coincides with the output of the counter 1302, the outputs of the data comparators 1304–1310 are H level which invert the outputs of the R-S FF 1311–1314.

For the timing signal (t), when the data comparator 1304 outputs a coincidence output by counting the count M of the counter 1302, the R-S FF 1311 is reset (FIG. 20). For a timing signal (u) indicating the arrival of the beam spot signal B2, the R-S FF is set by counting the count N1 of the counter 1302, and the R-S FF is reset when the counter 1302 counts N1+M (FIG. 20). Similarly, the R-S FF 1313 and the R-S FF 1314 are set by counting N2 and N3 by the counter 1302 and reset by the counts N2+M and N3+M, respectively.

For the timing signals (t)–(u), the rising timing thereof is important and the widths thereof may be of any value. The rising timing should coincide with a rise of a stepwise signal in the output signal of the beam detector 1. Thus, the rising timing of the timing signals (u)–(w) is adjusted by switching the preset values N1, N2 and N3 of the switches 1. When the beam spots B1–B4 have passed over the light receiving device 101 of the beam detector 1, the detection signal which is the output signal of the comparator 11 is L level and the counter 1302 is cleared and stops the count operation.

The timing signals (t)–(w) outputted from the timing signal generation circuit 13 are inputted to step down circuits 402–405. When the timing signals (t)–(w) are applied, the step down circuits 402–405 steps down the clock frequency from the oscillation circuit 401 by a factor of 1/P. In this manner, the step down circuits 402–405 generates the image clock signal. The oscillation circuit 401 may share the oscillation circuit 1301 provided in the timing signal generation circuit to be used by the timing signal generation circuit 13.

An image data controller 6 has information in a dot matrix form to form an image on the record medium and outputs record information for each main scan line to line buffers 701–704. Thus, the line buffers 701–704 has the record information for the scan lines. The line buffers 701–704 sequentially output the record information contained therein as the image clock signal is applied. The output record information is transferred to laser drive modulation circuits 801–804 to modulate lasers 9a, 9b, 9c and 9d arranged in the light source unit 9 to emit modulated laser beams ha, hb, hc and hd.

In such a prior art apparatus, since the detection signal is generated by detecting the rising timing of the first incident beam to the beam detector and the timing signal for the beam is generated by the detection signal for each elapse of the predetermined time period, the following problems are encountered.

(1) In the assembling process, the adjustment step to set the predetermined time period to generate the position detection signal for each beam is required, which leads to the increase of cost.

(2) When the timer is used to generate the timing signal, the precision of the timer determines the scan start position and hence a high precision timer is required. Thus, the cost reduction is difficult to attain.

(3) Since the clock frequencies of the oscillation circuits used for the timing signal generation circuit and the step down circuit are high, spurious noises are readily generated from wiring patterns on a printed circuit board.

SUMMARY OF THE INVENTION

It is an object of the present invention to overcome the above problems and improve the reliability and economy of the apparatus.

In accordance with one aspect of the present invention, there is provided an image forming apparatus for simultaneously scanning a record medium by a plurality of laser beams, comprising: a beam detector capable of simultaneously detecting all of the scanning laser spots; a position detector for detecting the arrival of the laser spots at a predetermined position in response to an output signal of the beam detector; and a distributor for distributing the beam position detection signal outputted by the position detector. The initiation of recording of the laser beams is controlled by the distributed beam position detection signal.

In accordance with a further aspect of the present invention, the beam detector includes a variable gain amplifier and a gain of the beam detector is controlled by the beam position detection signal.

In accordance with the present invention,
(1) the arrival of the laser spot at the predetermined position may be automatically detected without depending on the spot size and the intensity of the laser beams scanning over the record medium, and
(2) the dynamic range of the electric circuit may be reduced by controlling an amplification factor of the beam detector.

DETAILED DESCRIPTION OF THE PREFERRED EMBODIMENTS

The present embodiments of the present invention will now be described in conjunction with the accompanying drawings.

[Embodiment 1]

Figure 1:
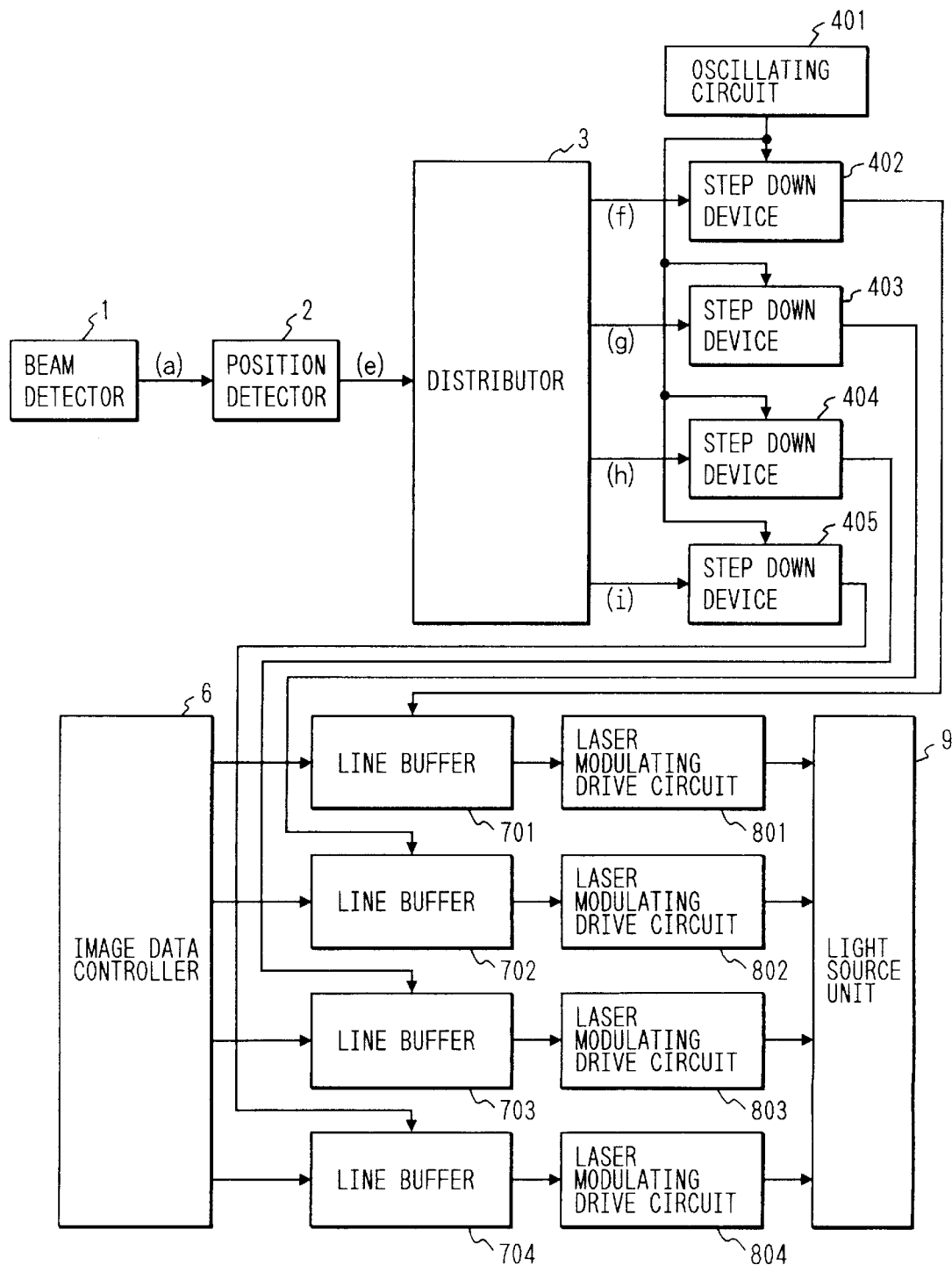
FIG. 1 shows a block diagram of an apparatus in accordance with an embodiment 1 of the present invention.
Figure 2:
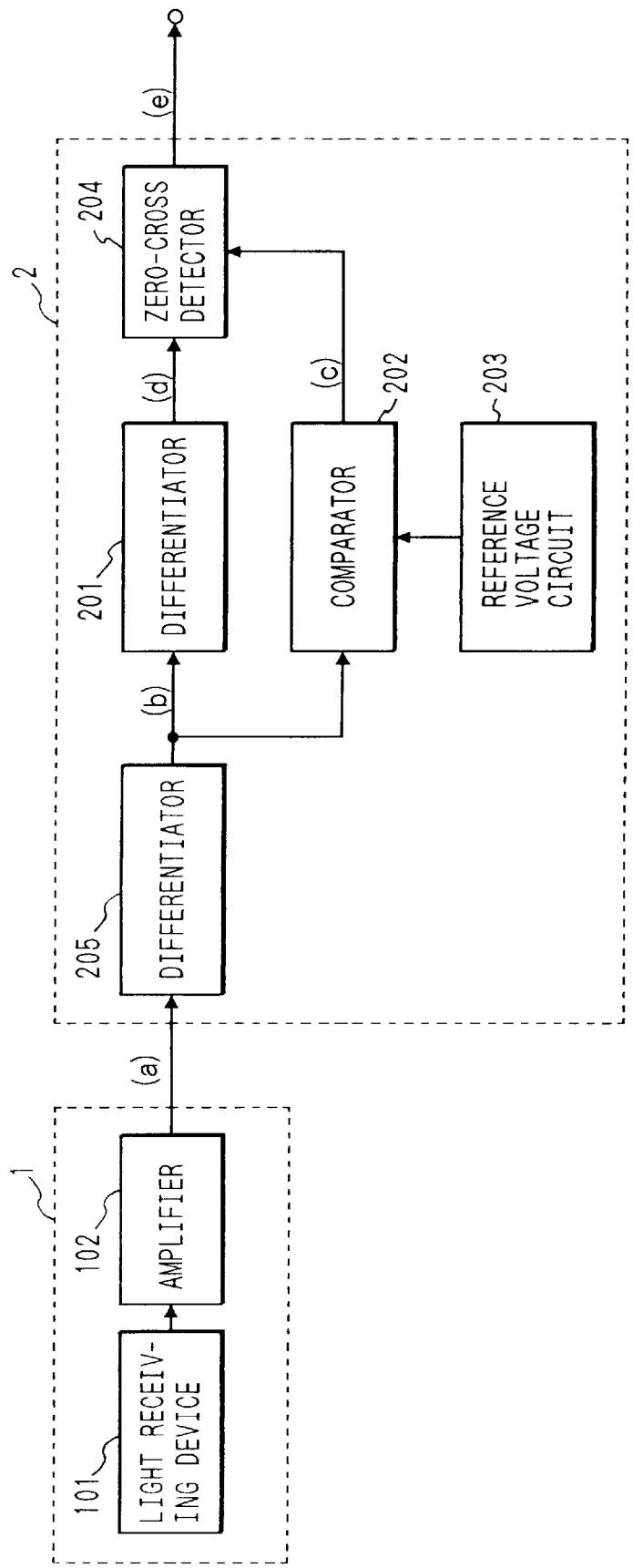
FIG. 2 shows a block diagram of a beam detector and a position detector in the embodiment 1.
Figure 3:
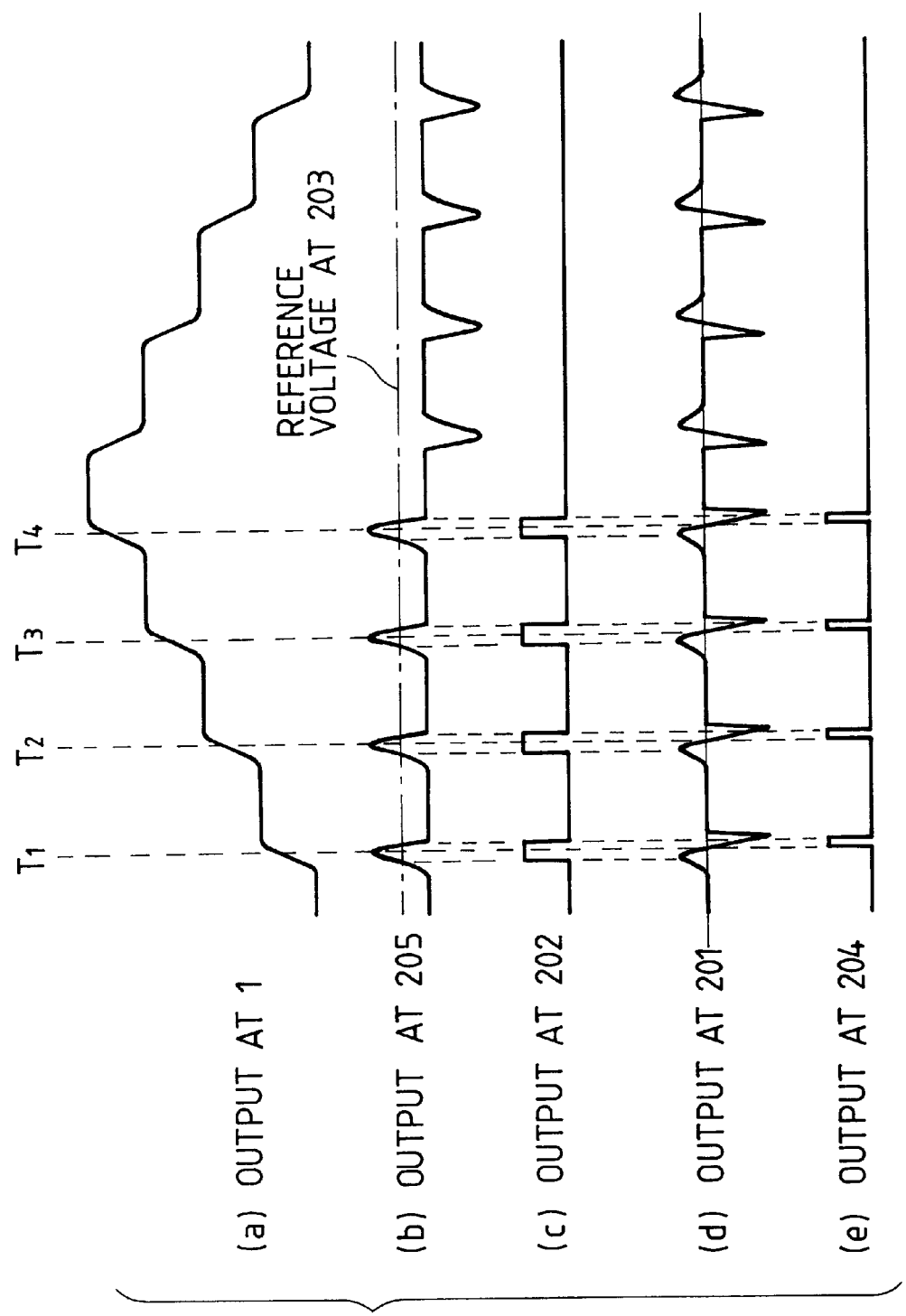
FIG. 3 shows signal waveforms of the beam detector and the position detector of the embodiment 1.

FIG. 1 shows a configuration of an apparatus of the present embodiment, FIG. 2 shows a block diagram of a beam detector 1 and a position detector 2 in the present embodiment, and FIG. 3 shows signal waveforms in FIG. 2. In those figures, the same elements to those of the prior art apparatus are designated by the same numerals.

Figure 19:
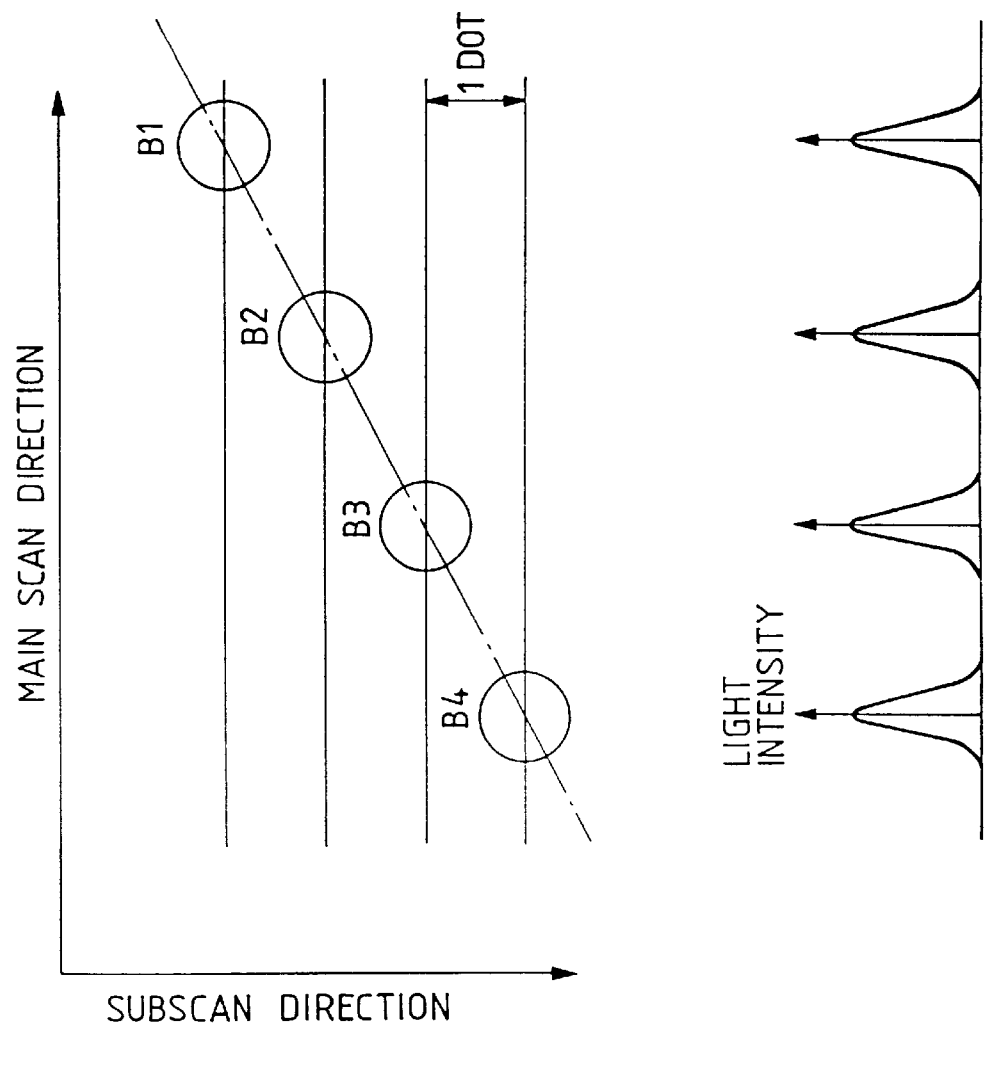
FIG. 19 shows a schematic view of a laser spot and a laser intensity distribution.
Figure 20:
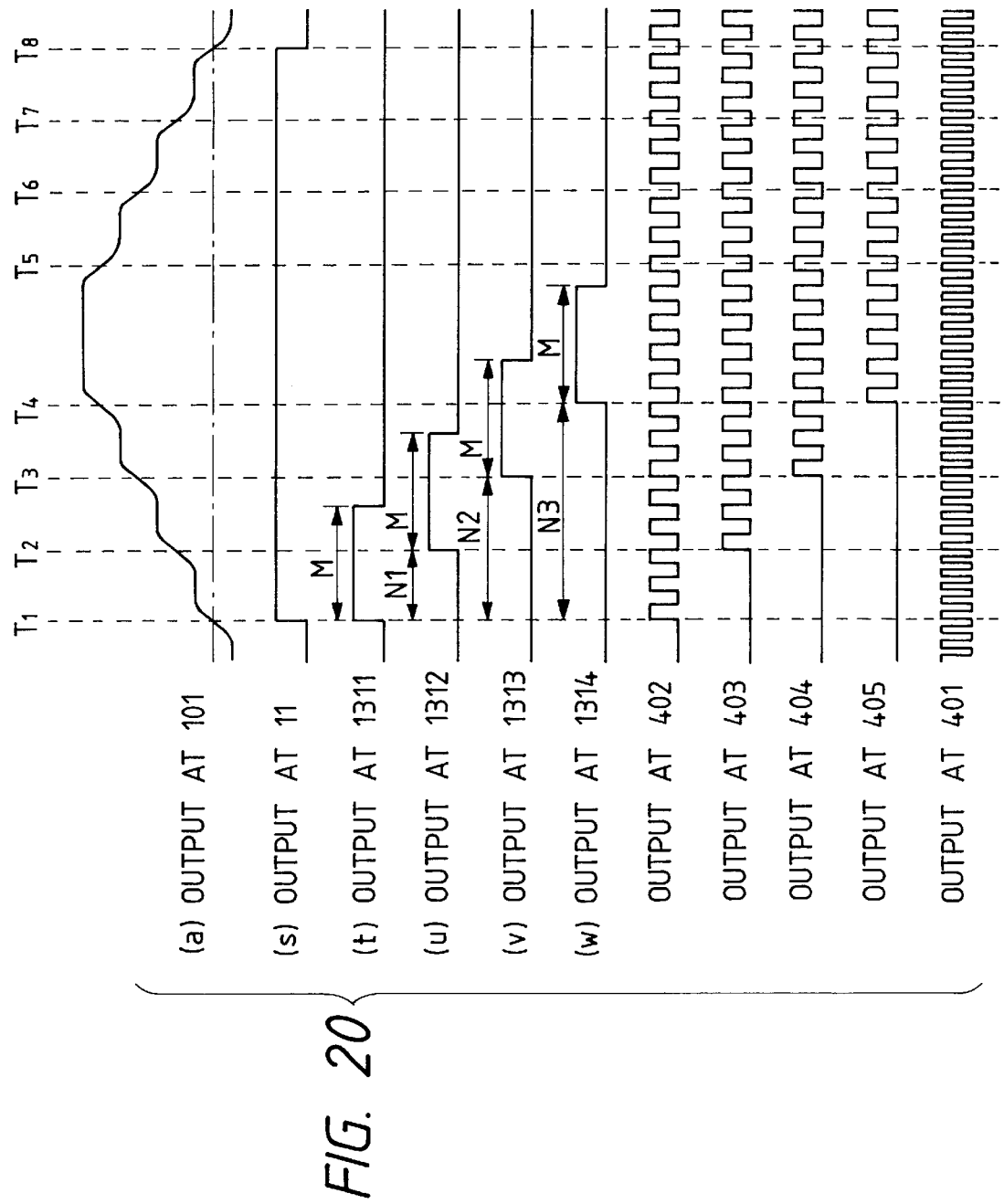
FIG. 20 shows signal waveforms in the apparatus of FIG. 17.
Figure 21:
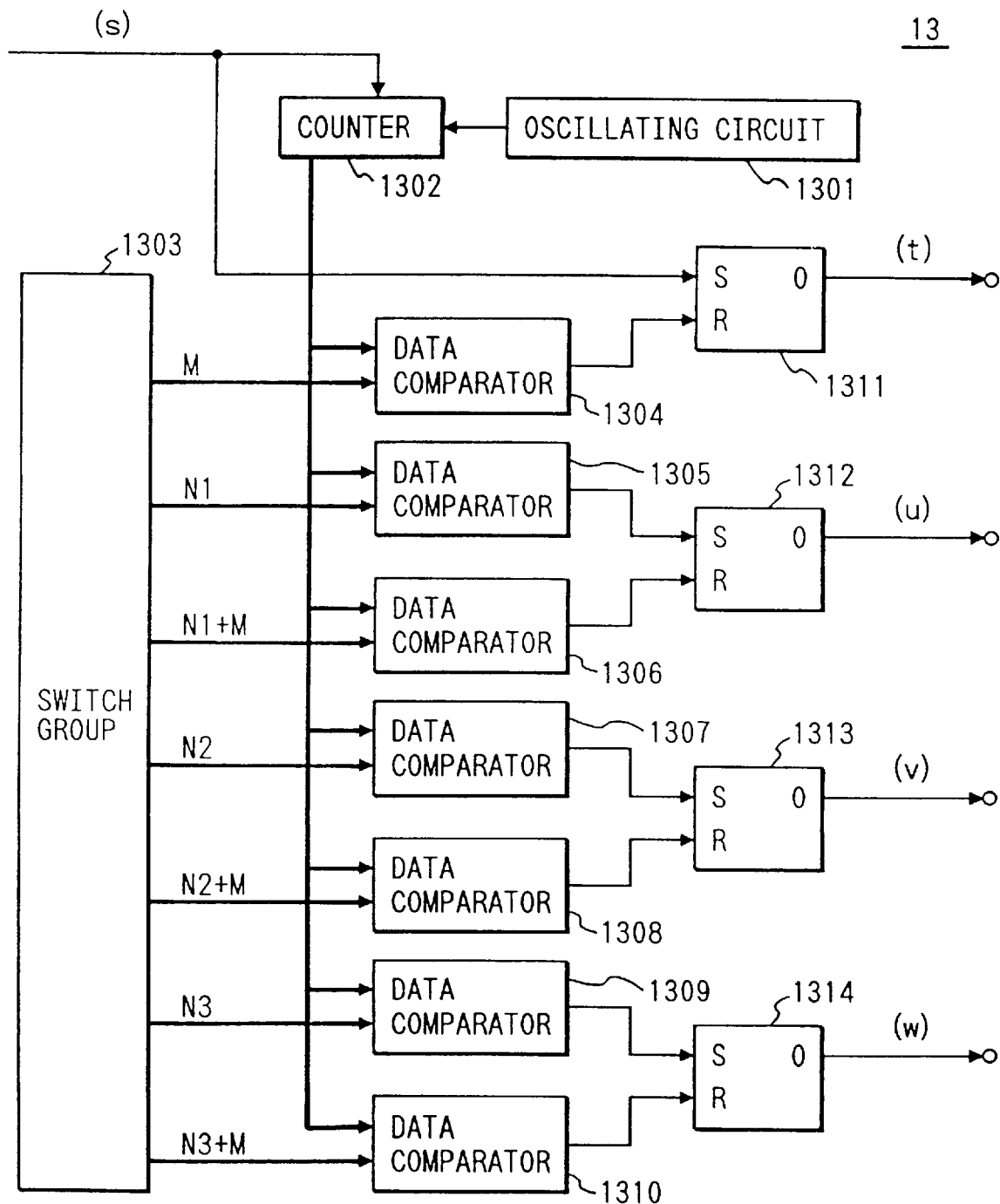
FIG. 21 shows a block diagram of a timing signal generation circuit 13 shown in FIG. 17.

Like in FIG. 19, a plurality of laser spots arranged to be irradiated to a record medium with the same intensity distribution, and arranged at non-right angles with a main scan direction and at one dot interval in a sub-scan direction are irradiated to the beam detector 1. An electrical signal representing the irradiated intensity is outputted from a light receiving device (photodetector) 101, amplified by an amplifier 102 and outputted from the beam detector 1 as a signal waveform shown by (a) of FIG. 3.

The output signal of the beam detector 1 is inputted to the position detector 2. The output signal of the beam detector 1 is first differentiated by a differentiator 205 which produces an output signal having a waveform shown by (b) of FIG. 3. The output signal of the differentiator 205 is inputted to a differentiator 201 and a comparator 202. The signal inputted to the comparator 202 is compared with a predetermined slice level supplied from a reference voltage circuit 203 to produce a signal waveform shown by (c) of FIG. 3. The output signal of the comparator 202 is inputted to a zero-cross detector 204 as an enable signal for the zero-cross detector 204.

The signal inputted to the differentiator 201 is differentiated by the differentiator 201 which outputs a signal waveform shown by (d) of FIG. 3. The output signal of the differentiator 201 is inputted to the zero-cross detector so that the zero-cross detection by the zero-cross detector 204 is enabled when the output signal of the comparator 202 is H level to conduct the zero-cross detection of the output signal of the differentiator 201. The output of the zero-cross detector 204 is rendered H level by the detected zero-cross point. When the output signal of the comparator 202 is L level, the zero-cross detector 204 is disabled and the output is rendered L level. Accordingly, a beam position detection signal, as shown by (e) of FIG. 3, indicating the arrival of the laser spots scanning over the record medium at the predetermined position is generated.

Figure 4:
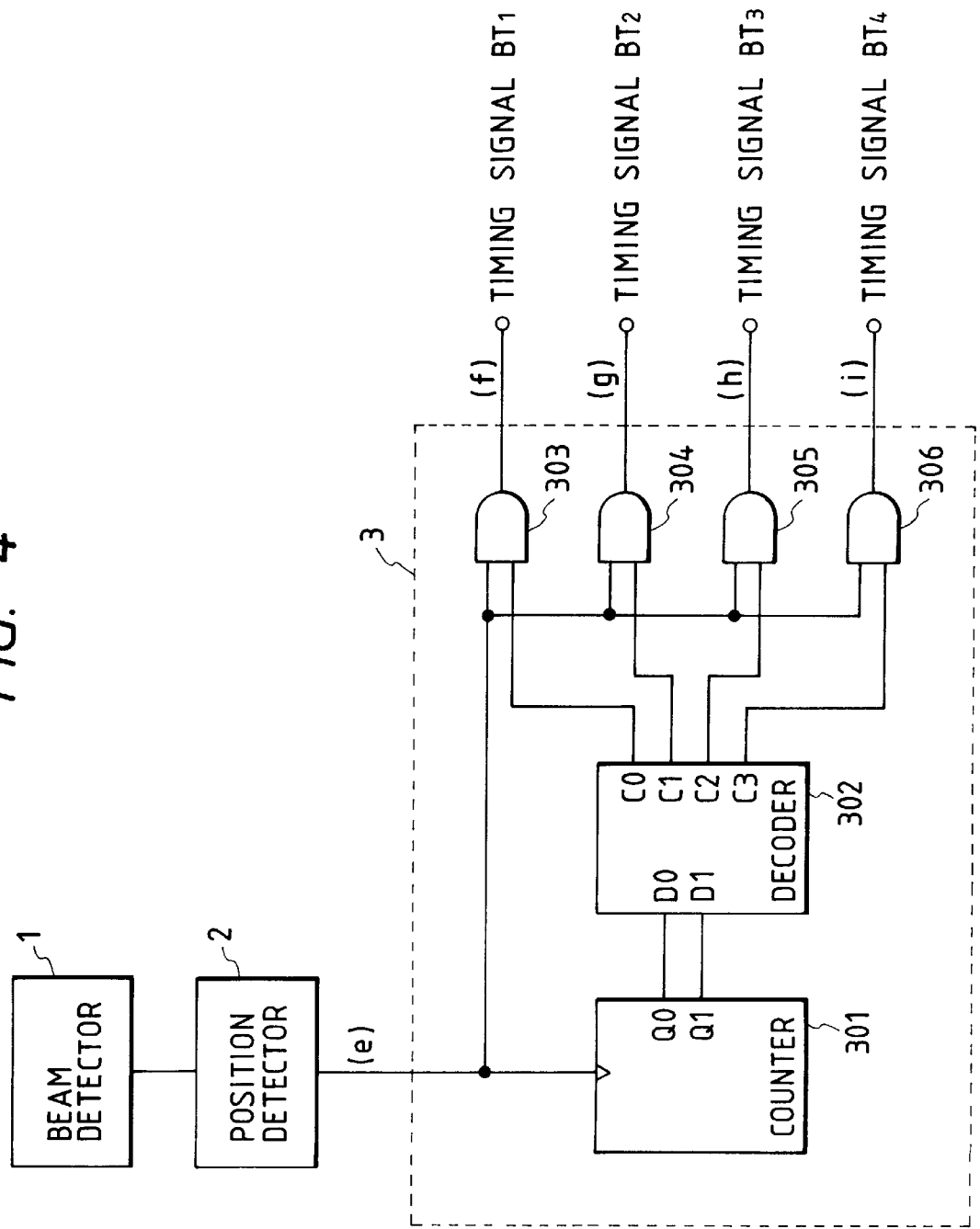
FIG. 4 shows a configuration of a distributor in the embodiment 1.
Figure 5:
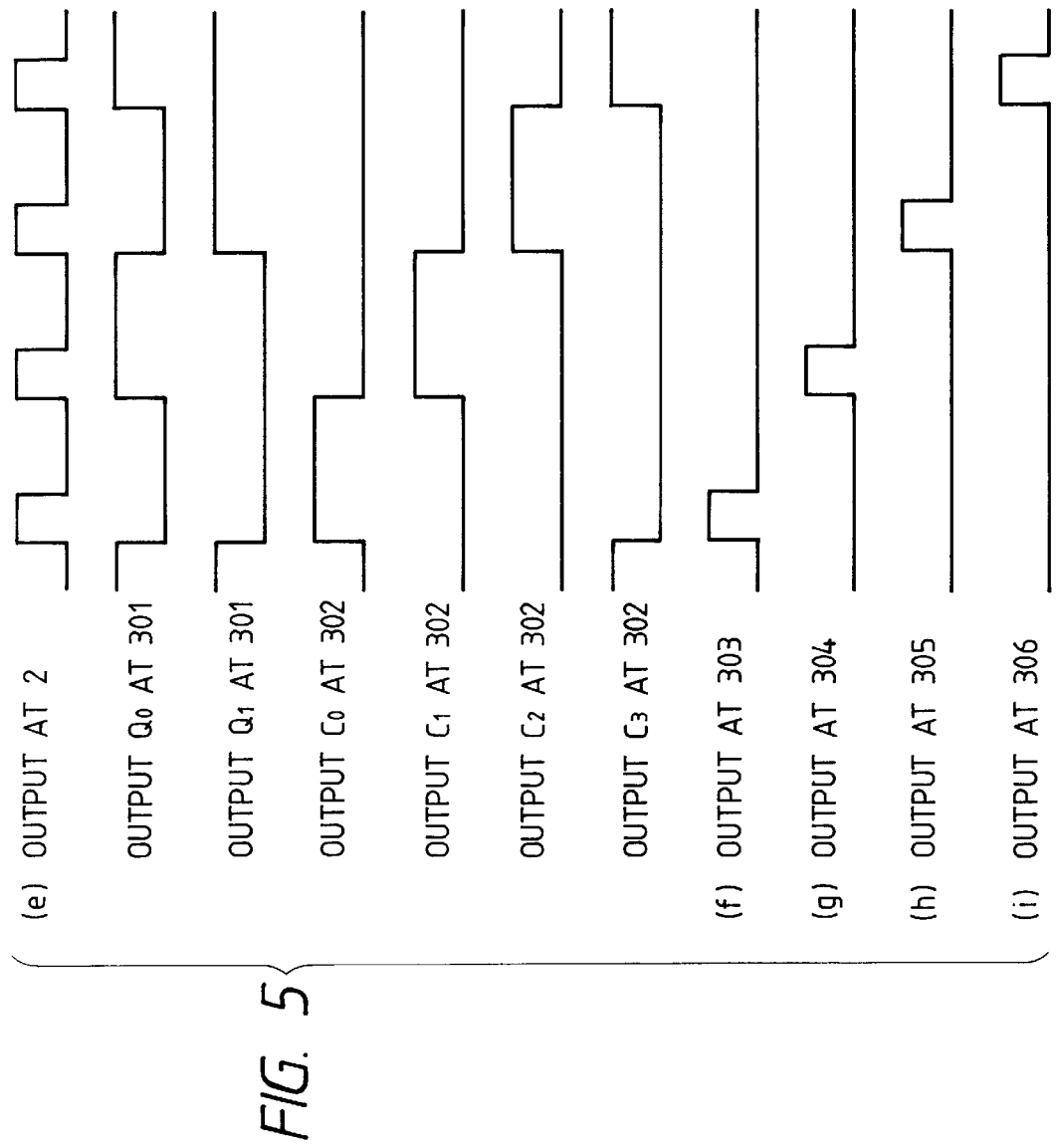
FIG. 5 shows a timing chart of the distributor in the embodiment 1.

The beam position detection signal (c) is inputted to a distributor 3. FIG. 4 shows a block diagram of the distributor and FIG. 5 shows a timing chart of the distributor. The beam position detection signal is inputted to AND circuits 303–306 and also to a clock input of a scale-of-four counter 301. The scale-of-four counter 301 outputs a binary code count by the beam position detection signal and it is inputted to a decoder 302. Only the output signal of the decoder 302 which corresponds to the count of the scale-of-four counter 301 is at H level and other output signals are at L level. The output signals of the decoder 302 are inputted to the AND circuits 303–306.

The AND circuits 303–306 AND the beam position detection signal and the output signal of the decoder 302 corresponding to the beam count to distribute the beam position signals to generate timing signals BT1–BT4 corresponding to the laser spots B1–B4. The timing signals BT1–BT4 are inputted to step down circuits 402–405. The step down circuits 402–405 step down the clock frequency inputted from an oscillator 401 by a factor of 1/P in response to the application of the timing signals BT1–BT4. Thus, the step down circuits 402–405 generate image clocks synchronized with the clock of the oscillator 401 from the time at which the timing signal is detected.

An image data controller 6 has information in a dot matrix form to form an image on the record medium and outputs the image information for each main scan line to line buffers 701–704. Each of the line buffers 701–704 has record information for one scan and sequentially outputs the information contained therein in response to the application of the image clock. The output record information is transferred to laser modulation drive circuits 801–804 which modulates and drives the lasers 9a, 9b, 9c and 9d provided in the light source unit 9 to emit modulated beams ha, hb, hc and hd.

[Embodiment 2]

Figure 7:
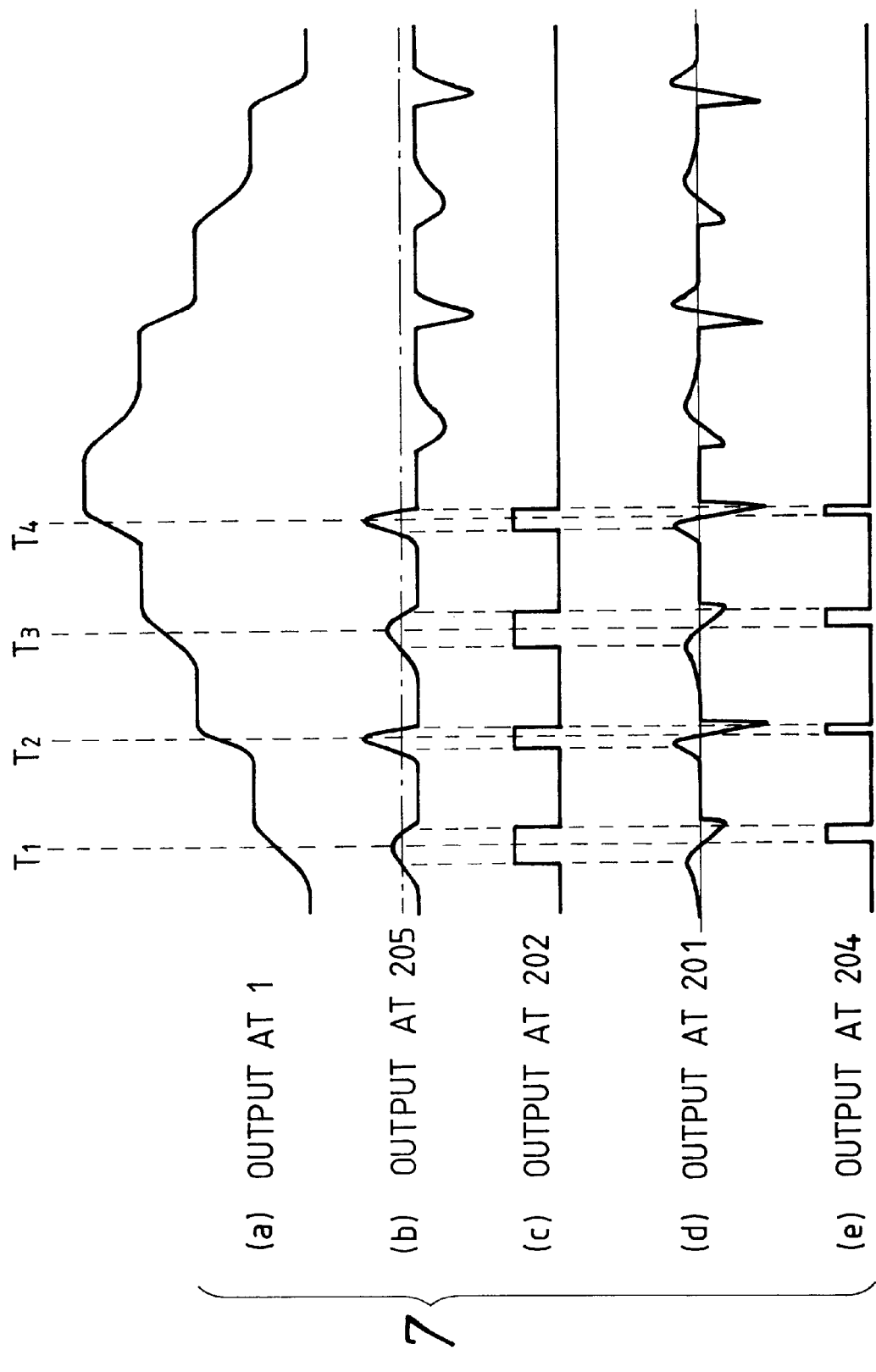
FIG. 7 shows waveforms of a beam detector and a position detector in the embodiment 2.

A block diagram of the embodiment 2 is identical to that shown in FIG. 1 for the embodiment 1, and the block diagram of the beam detector and the position detector is also identical to that shown in FIG. 2. FIG. 7 shows signal waveforms in FIG. 2. In FIG. 7, the like elements to those of the prior art apparatus are designated by the like numerals.

Figure 6:
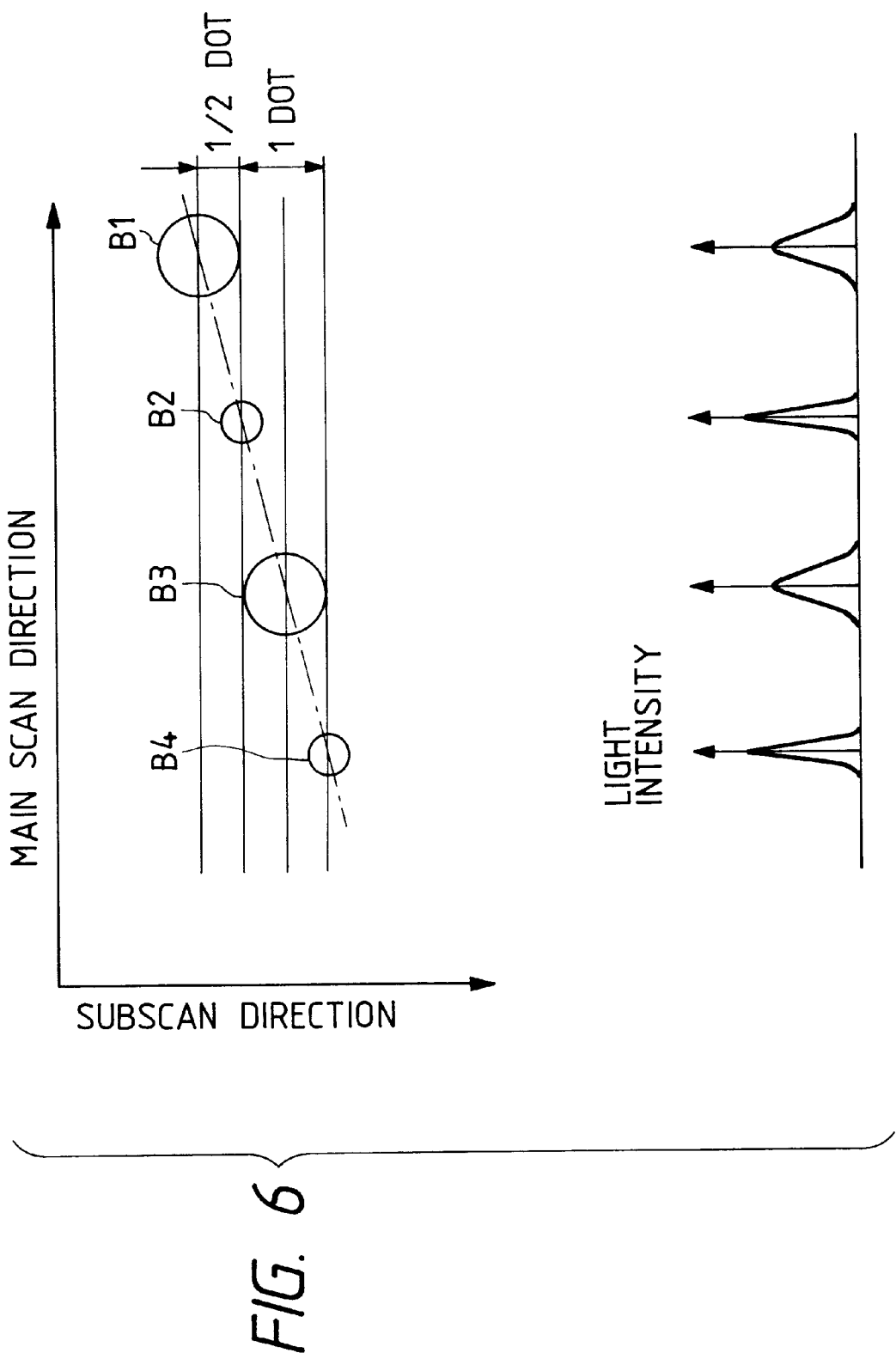
FIG. 6 shows a schematic view of a laser spot of an embodiment 2 and a laser intensity distribution.

In order to solve the problem of jaggi encountered in the raster scan image forming apparatus, laser spots B1–B4 as shown in FIG. 6 are arranged on the record medium. A laser spot interval for the sub-scan direction of the laser spots B1 and B3 is one-dot interval which is a resolution in the conventional apparatus, and the laser spots B2 and B4 are arranged at ½ dot interval, and at non-right angles with the main scan direction. The laser intensities are set such that the intensity distributions of the laser spots B1 and B3 are equal and the intensity distributions of the laser spots B2 and B4 are equal, and image density distributions of the laser spots B1 and B3 are two times as large as the image density distributions of the laser spots B2 and B4.

When the laser spots B1–B4 are irradiated to the beam detector 1, electrical signals representing the irradiation intensities are outputted from the light receiving device 101, and they are amplified by an amplifier 102 and a signal waveform as shown by (a) of FIG. 7 is outputted from the beam detector 1. The output signal of the beam detector 1 is inputted to the position detector 2, differentiated by a differentiator 205 and a signal waveform as shown by (b) of FIG. 7 is outputted. The output signal of the differentiator 205 is inputted to a differentiator 201 and a comparator 202. The signal inputted to the differentiator 201 is differentiated by the differentiator 201 to form a signal as shown by (d) of FIG. 7 which is inputted to a zero-cross detector 204. The zero-cross detector 204 has the detection state thereof controlled by the output signal of the comparator 202 to detect the zero-crossing of the output signal of the differentiator 201. As a result, as shown by (e) of FIG. 7, a beam position detection signal indicating the arrival of the laser spots scanning over the record medium at the predetermined position is generated. The beam position detection signal is inputted to the distributor 3 for signal processing as it is in the embodiment 1.

[Embodiment 3]

Figure 9:
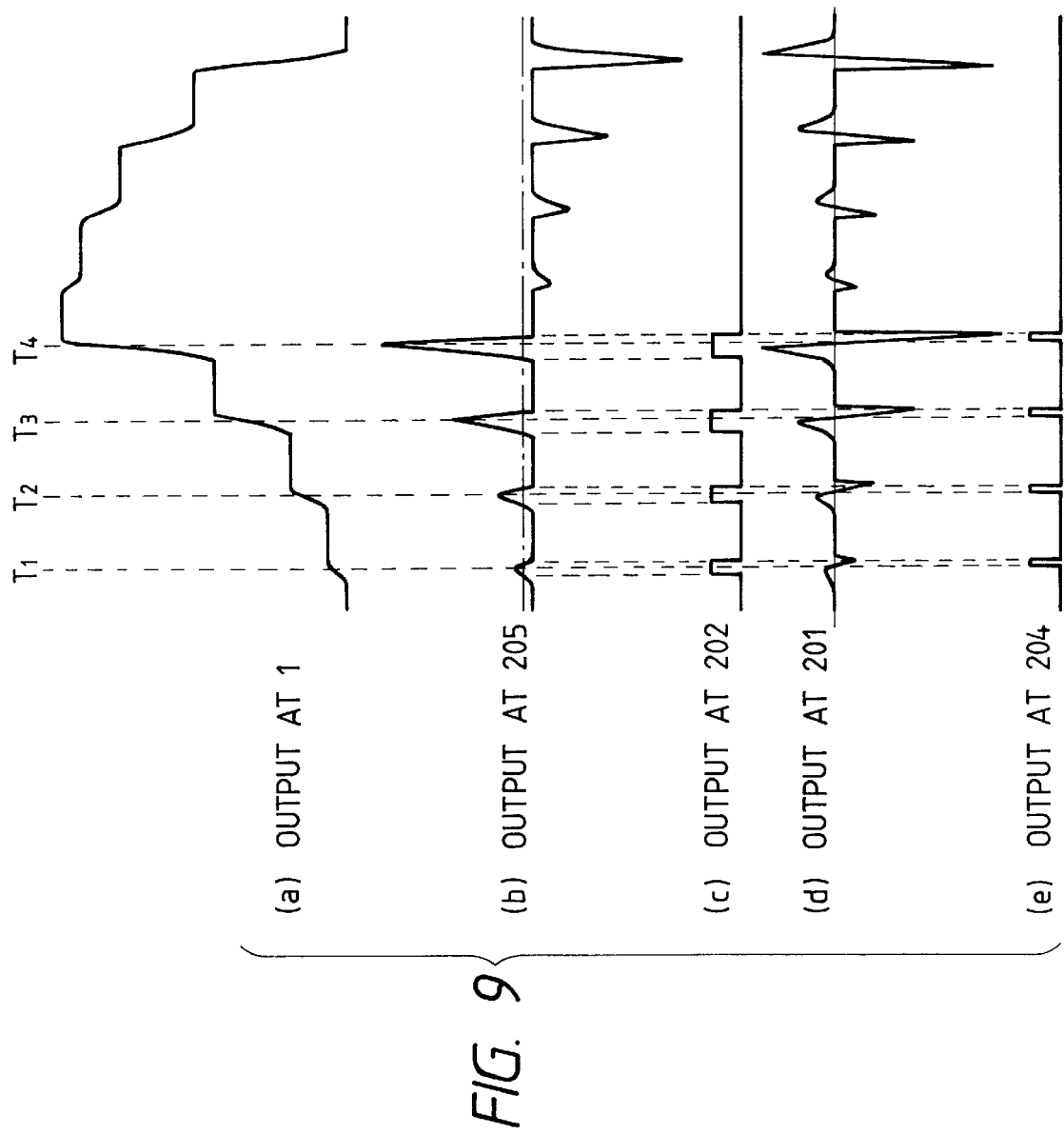
FIG. 9 shows signal waveforms of a beam detector and a position detector in the embodiment 3.

A block diagram of the embodiment 3 is identical to that shown in FIG. 1 for the embodiment 1 and a block diagram of the beam detector and the position detector is also identical to that shown in FIG. 2. FIG. 9 shows signal waveforms in FIG. 2. In FIG. 9, the like numerals to those in the prior art apparatus and other embodiment are designated by the like numerals.

Figure 8:
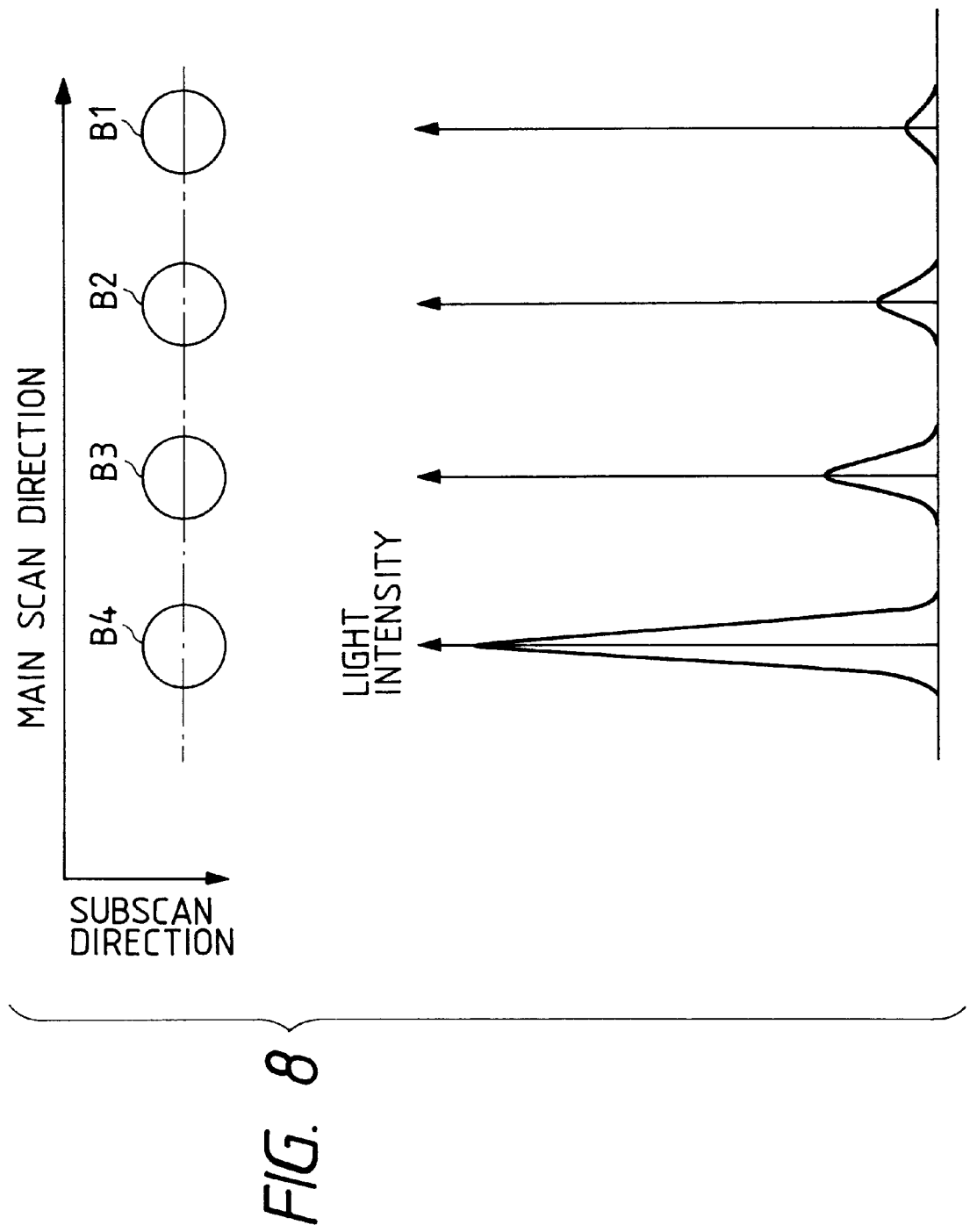
FIG. 8 shows a schematic view of a laser spot in an embodiment 3 and a laser intensity distribution.

In order to attain laser modulation drive equivalent to laser intensity modulation in a multi-tone image forming apparatus, laser spots B1–B4 as shown in FIG. 8 are arranged on the record medium. The laser spots B1–B4 are arranged in parallel to the main scan direction and the laser spot intensities are set to B1:B2:B3:B4=1:2:4:8.

When the laser spots B1–B4 are irradiated to the beam detector 1, electrical signals representing the irradiation intensities are outputted from the light receiving device 101 and amplified by the amplifier 102 and a signal waveform as shown by (a) of FIG. 9 is outputted from the beam detector 1. The output signal of the beam detector 1 is inputted to the position detector 2 and differentiated by the differentiator 205 to output a signal waveform as shown by (b) of FIG. 9. The output signal of the differentiator 205 is inputted to the differentiator 201 and the comparator 202. The signal inputted to the differentiator 201 is differentiated by the differentiator 201 which generates a signal as shown by (d) of FIG. 9, which is inputted to the zero-cross detector 204. The zero-cross detector 204 has the detection state thereof controlled by the output signal of the comparator 202 and detects the zero-crossing of the output signal of the differentiator 201. As a result, as shown by (e) of FIG. 9, a beam position detection signal indicating the arrival of the laser beam spots scanning on the record medium at the predetermined position is generated. The beam position detection signal is inputted to the distributor 3 for processing as it is in the embodiment 1.

[Embodiment 4]

Figure 10:
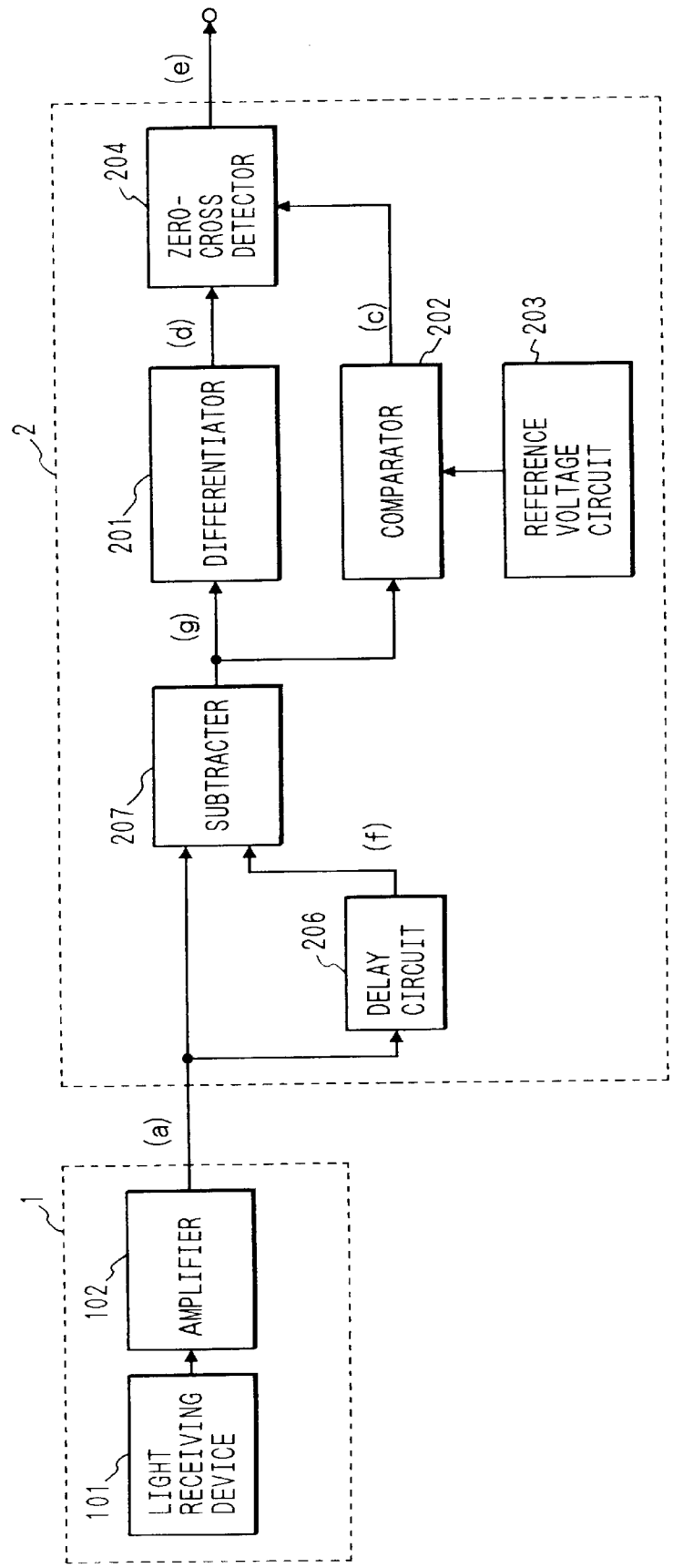
FIG. 10 shows a block diagram of a beam detector and a position detector in an embodiment 4.
Figure 11:
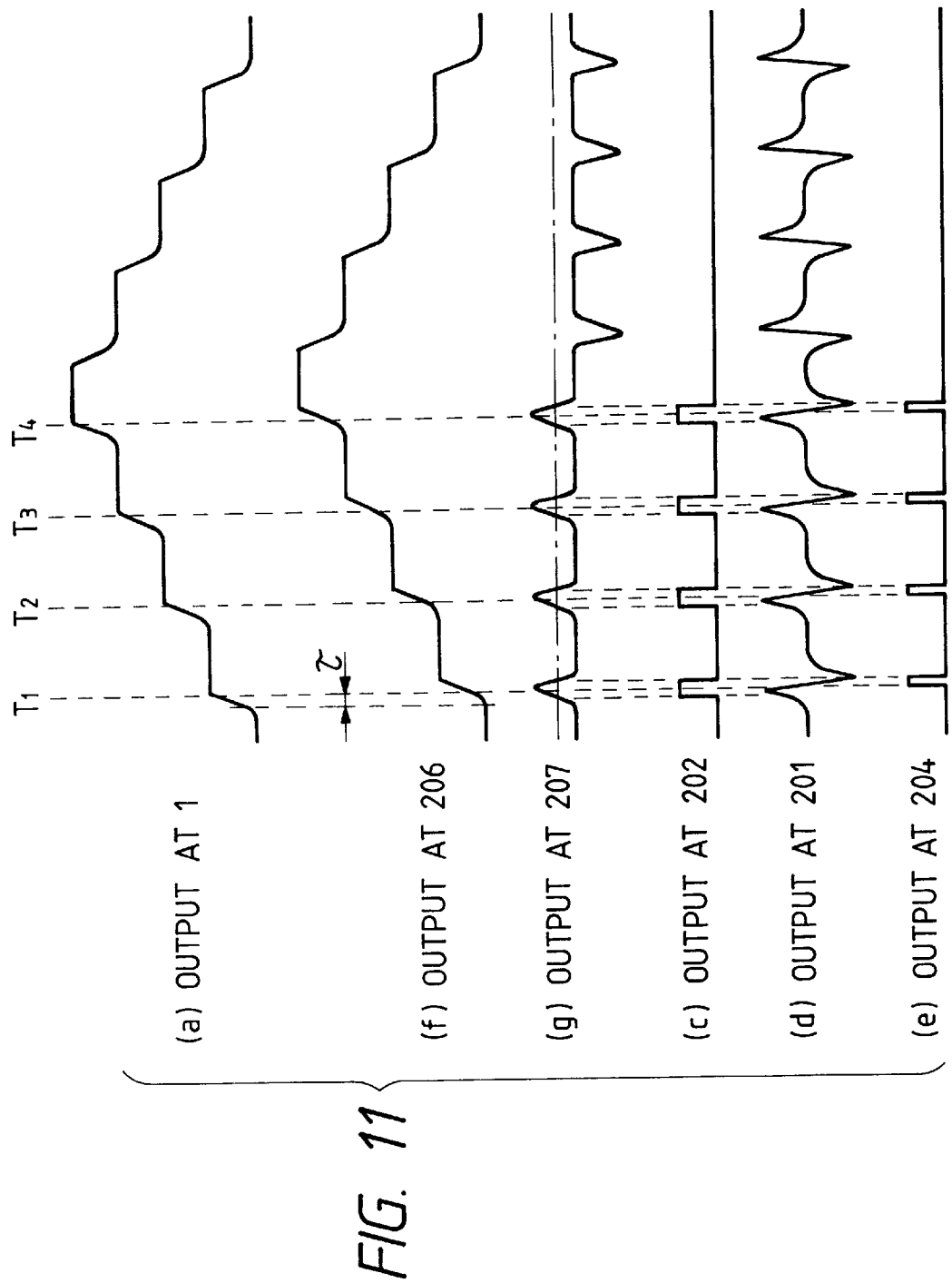
FIG. 11 shows signal waveforms of the beam detector and the position detector in the embodiment 4.

A block diagram of the apparatus of the embodiment 4 is identical to that shown in FIG. 1 for the embodiment 1. FIG. 10 shows a block diagram of the beam detector and the position detector and FIG. 11 shows signal waveforms in FIG. 10. In FIGS. 10 and 11, the same elements to those of the prior art apparatus and other embodiment are designated by the same numerals.

Like in the prior art apparatus shown in FIG. 19, the laser beams are arranged such that the laser beams B1–B4 irradiated on the record medium have the same intensity distribution, are at non-right angles with the main scan direction and have one-dot interval in the sub-scan direction, and they are irradiated to the beam detector 1. Electrical signals representing the irradiation intensities are outputted from the light receiving device 101, amplified by the amplifier and a signal waveform as shown by (a) of FIG. 11 is outputted from the beam detector 1.

The output signal of the beam detector 1 is inputted to the position detector 2 and to a delay circuit 206 and a subtractor 207 arranged in the position detector 2. As shown by (f) of FIG. 11, the output signal of the delay circuit 206 is delayed by a predetermined time τ with respect to the output signal of the beam detector 1 and the output is inputted to the subtractor 207. The subtractor 207 subtracts the output signal of the delay circuit 206 from the output signal of the beam detector 1 and outputs the difference to the differentiator 201 and the comparator 203. The signal inputted to the differentiator 201 is differentiated by the differentiator 201 which generates a signal as shown by (d) of FIG. 11 which is inputted to the zero-cross detector 204. The zero-cross detector 204 has the detection state thereof controlled by the output signal of the comparator 202 as shown by (c) of FIG. 11 and detects the zero-crossing of the output signal of the differentiator 201. As a result, as shown by (e) of FIG. 11, a beam position detection signal indicating the arrival of the laser spots scanning over the record medium at the predetermined position is generated. The beam position detection signal is inputted to the distributor 3 for processing as it is in the embodiment 1.

[Embodiment 5]

Figure 12:
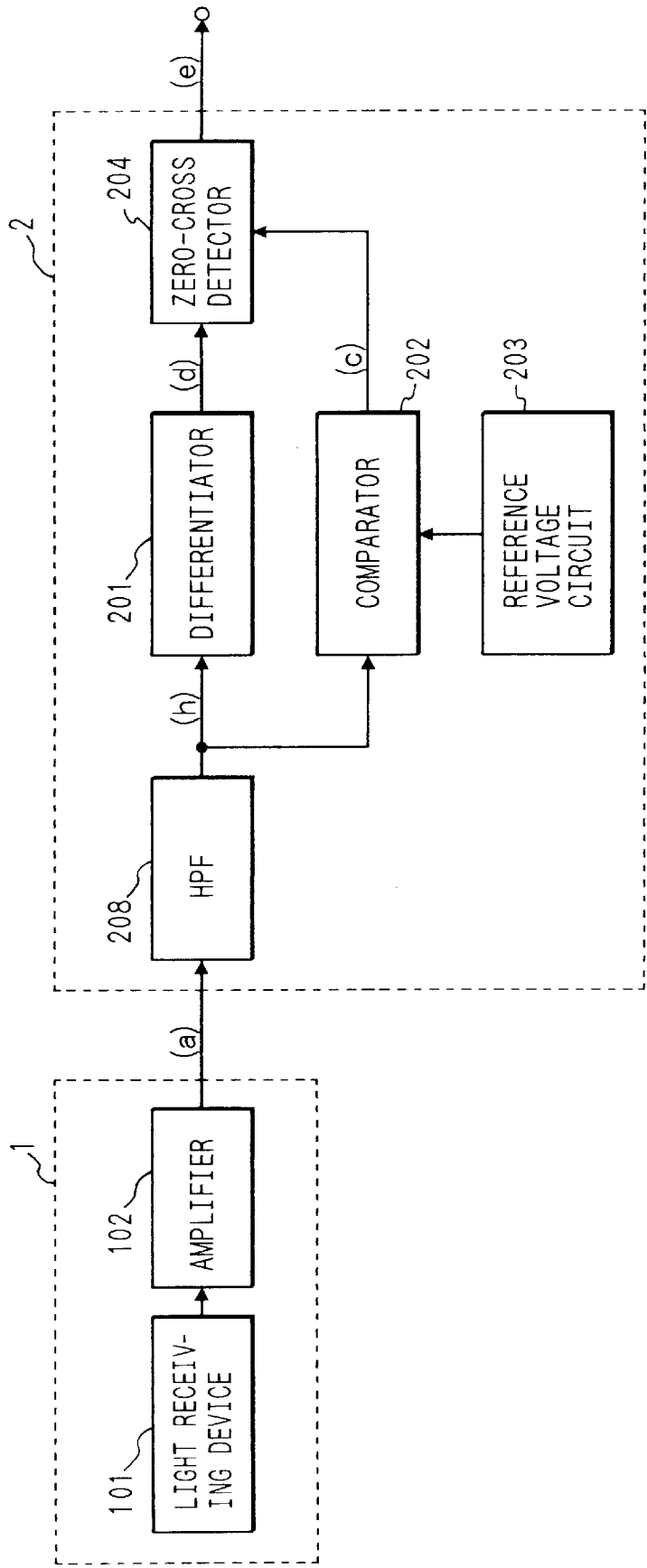
FIG. 12 shows a block diagram of a beam detector and a position detector in an embodiment 5.
Figure 13:
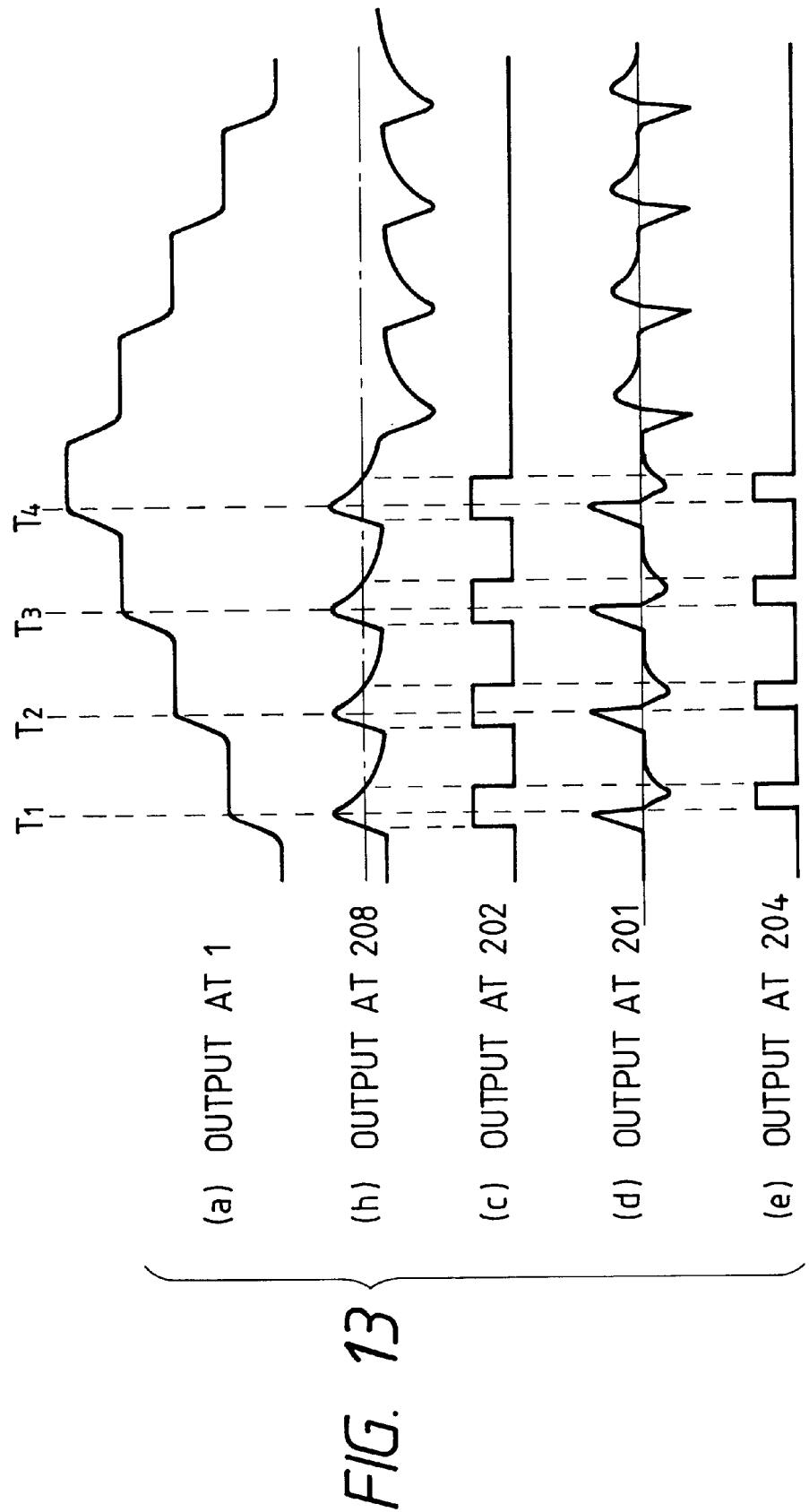
FIG. 13 shows signal waveforms of the beam detector and the position detector in the embodiment 5.

A block diagram of the apparatus of the embodiment 5 is identical to that shown in FIG. 1 for the embodiment 1. FIG. 12 shows a block diagram of the beam detector and the position detector and FIG. 13 shows signal waveforms in FIG. 12. In FIGS. 12 and 13, the same elements to those in the prior art apparatus and other embodiment are designated by the like numerals.

Like in the prior art apparatus shown in FIG. 19, the laser beams are arranged such that the laser beams B1–B4 irradiated to the record medium have the same intensity distribution, are at non-right angles with the main scan direction and at one-dot interval in the sub-scan direction, and are irradiated to the beam detector 1. Electrical signals representing the irradiation intensities are outputted from the light-receiving device 101, amplified by the amplifier 102 and outputted from the beam detector 1 as a signal waveform as shown by (a) of FIG. 13.

The output signal of the beam detector 1 is inputted to the position detector 2 and to a high-pass filter 208 arranged in the position detector 2. The high-pass filter 208 cuts a low frequency component of the signal and it may be a band pass filter or an AC coupling capacitor. An output signal of the high-pass filter 208 has a signal waveform as shown by (h) of FIG. 13 because the low frequency component of the beam detector is attenuated. The output signal of the high-pass filter 208 is inputted to the differentiator 201 and the comparator 202.

The signal inputted to the differentiator 201 is differentiated by the differentiator 201 to generate a signal as shown by (d) of FIG. 13 which is outputted to the zero-cross detector 204. The zero-cross detector 204 has the detection state thereof controlled by the output signal of the comparator 202 as shown by (c) of FIG. 13 and detects the zero-crossing of the output signal of the differentiator 201. As a result, as shown by (e) of FIG. 13, a beam position detection signal indicating the arrival of the laser spots scanning over the record medium at the predetermined position is gener- ated. The beam position detection signal is inputted to the distributor for processing as it is in the embodiment 1.

[Embodiment 6]

Figure 14:
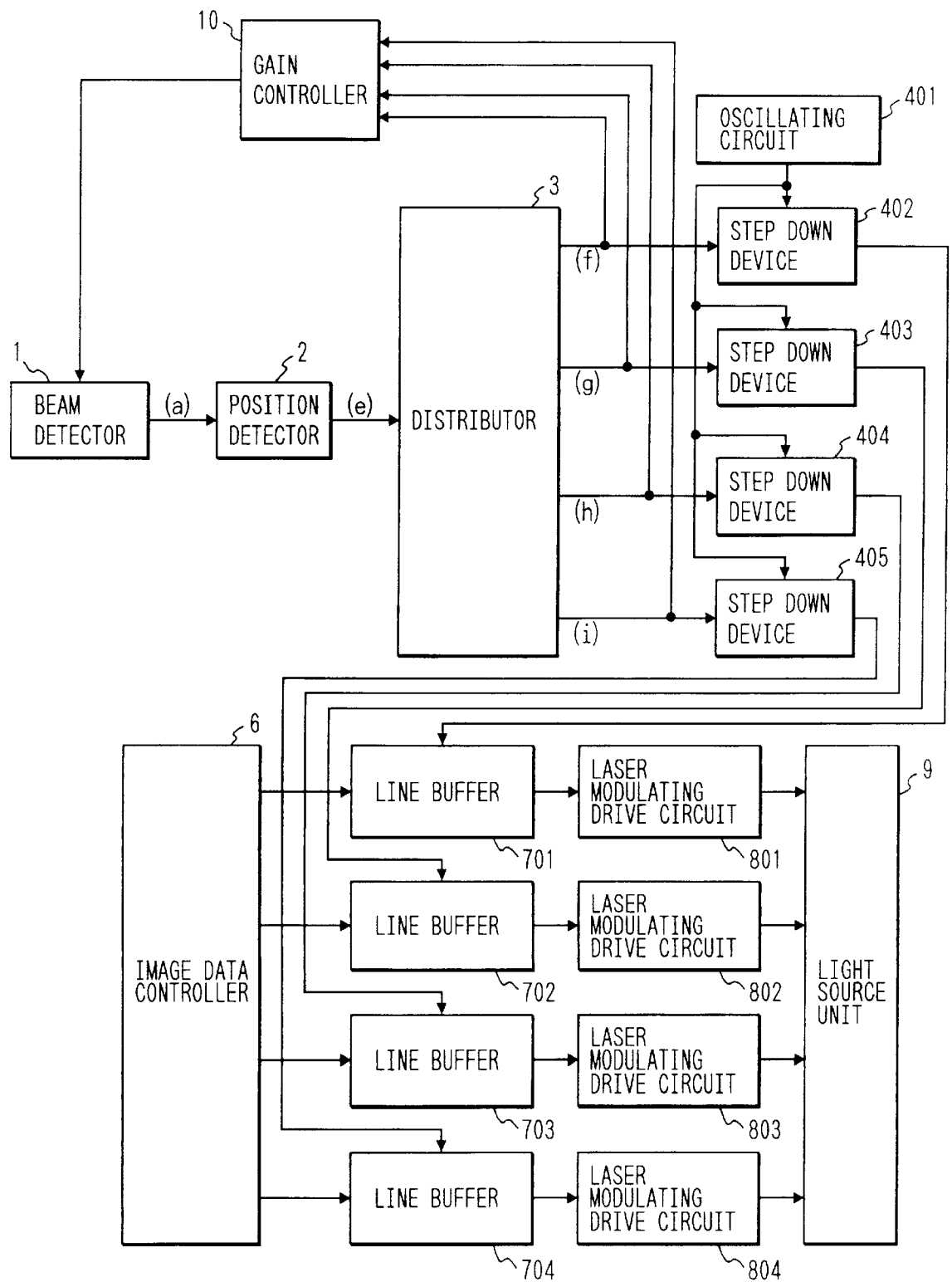
FIG. 14 shows a block diagram of an apparatus in accordance with an embodiment 6.
Figure 15:
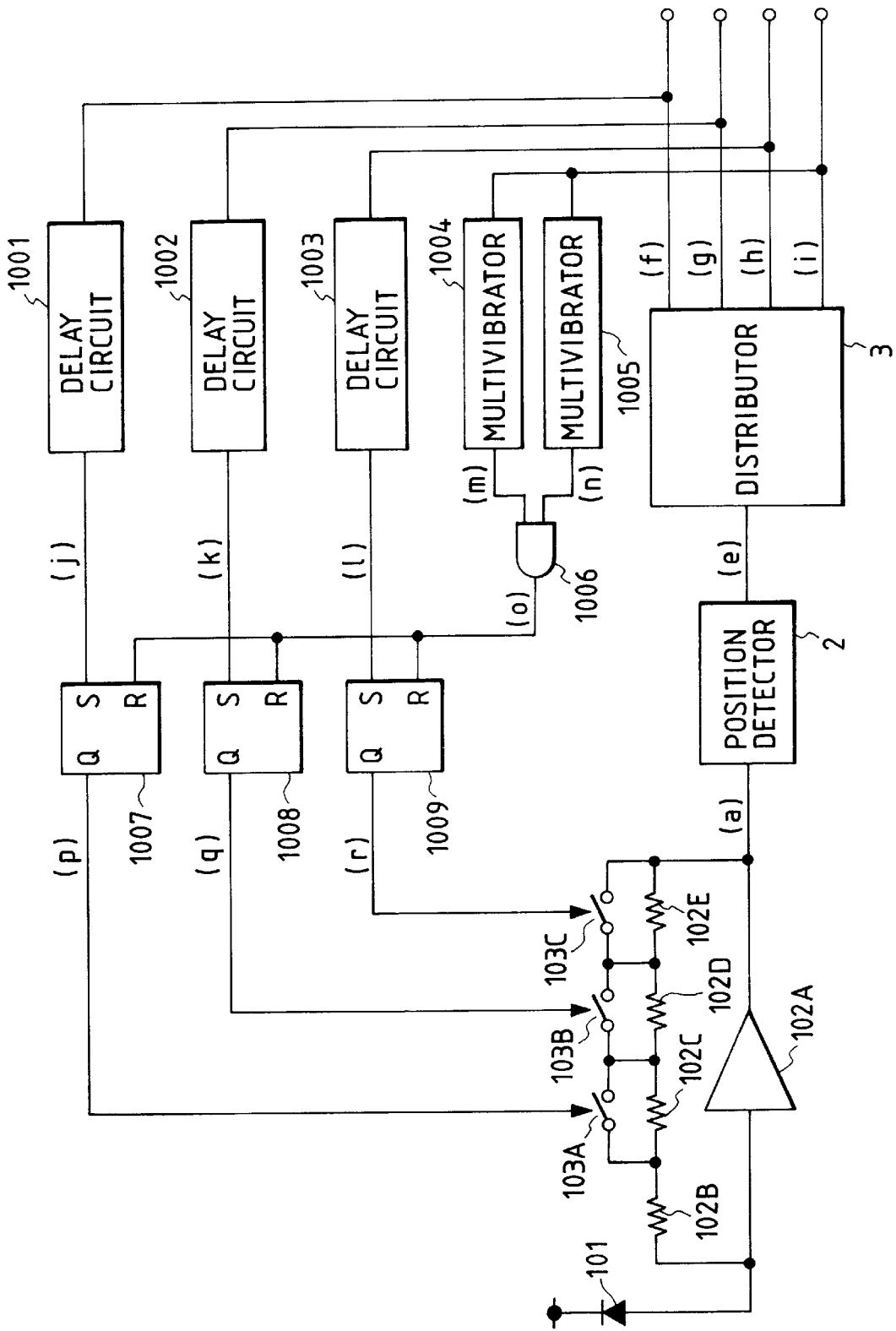
FIG. 15 shows a block diagram of a beam detector and a gain controller in the embodiment 6.
Figure 16:
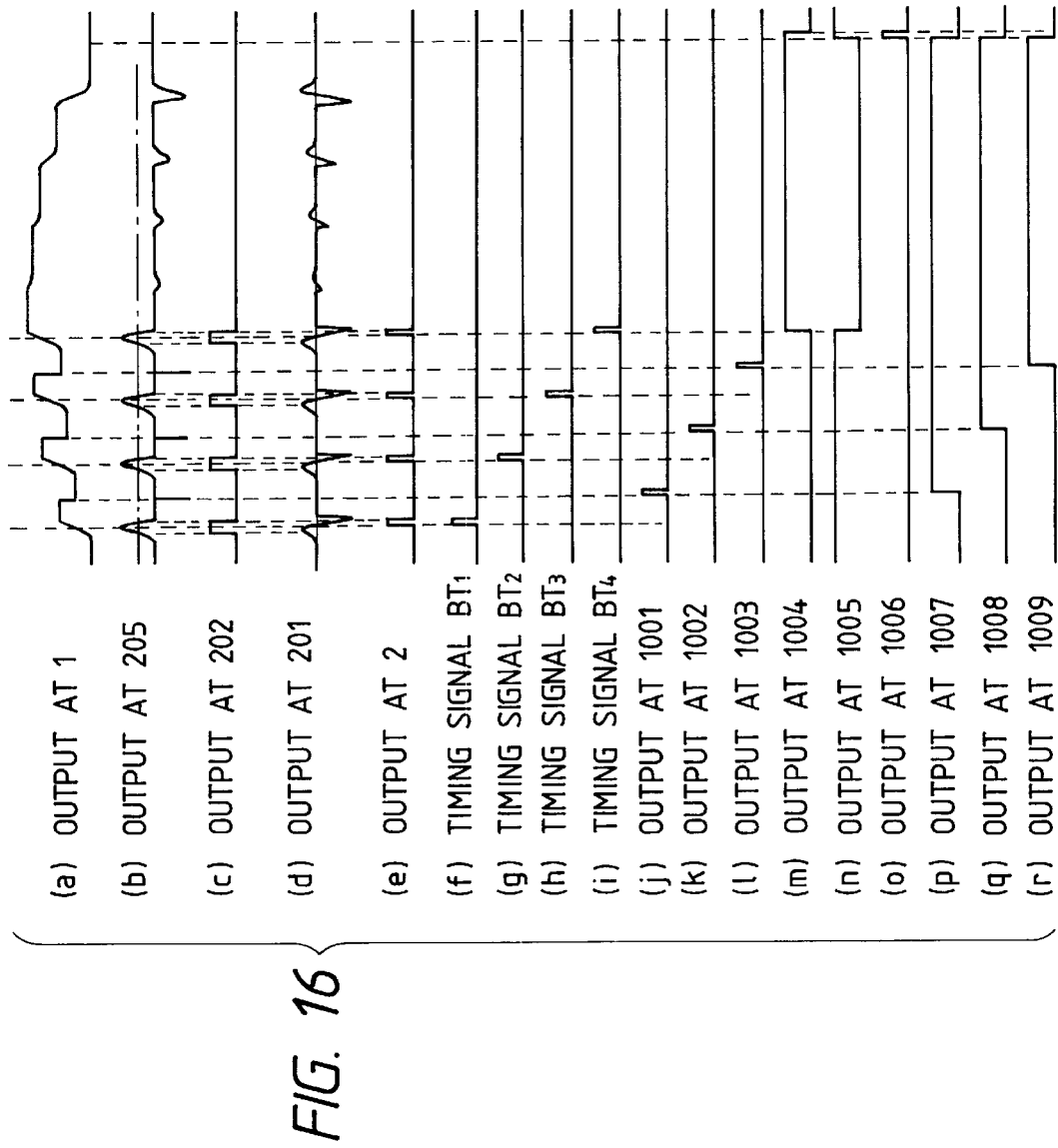
FIG. 16 shows signal waveforms of the beam detector, the position detector and the gain controller in the embodiment 6.
Figure 17:
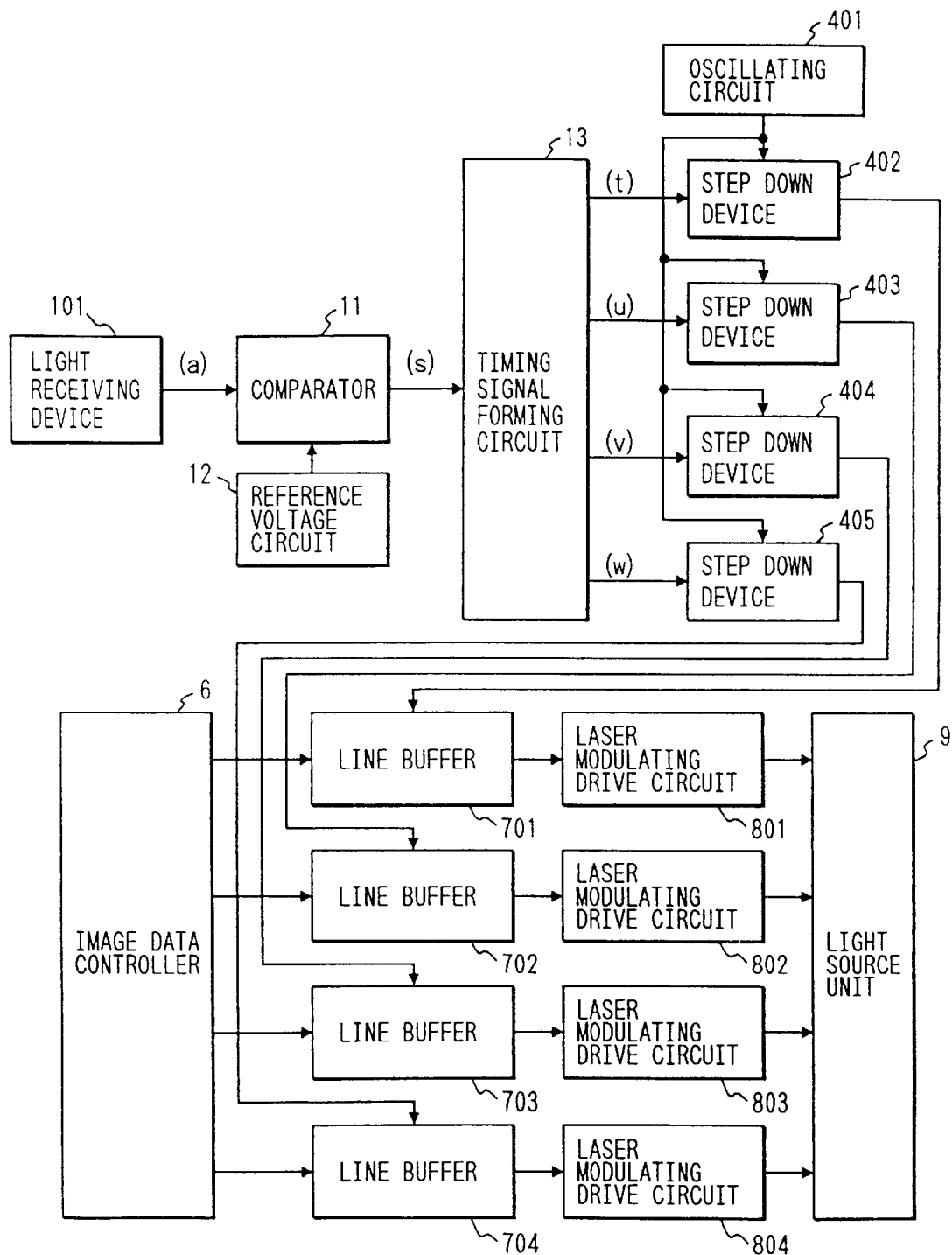
FIG. 17 shows a block diagram of a prior art apparatus.
Figure 18:
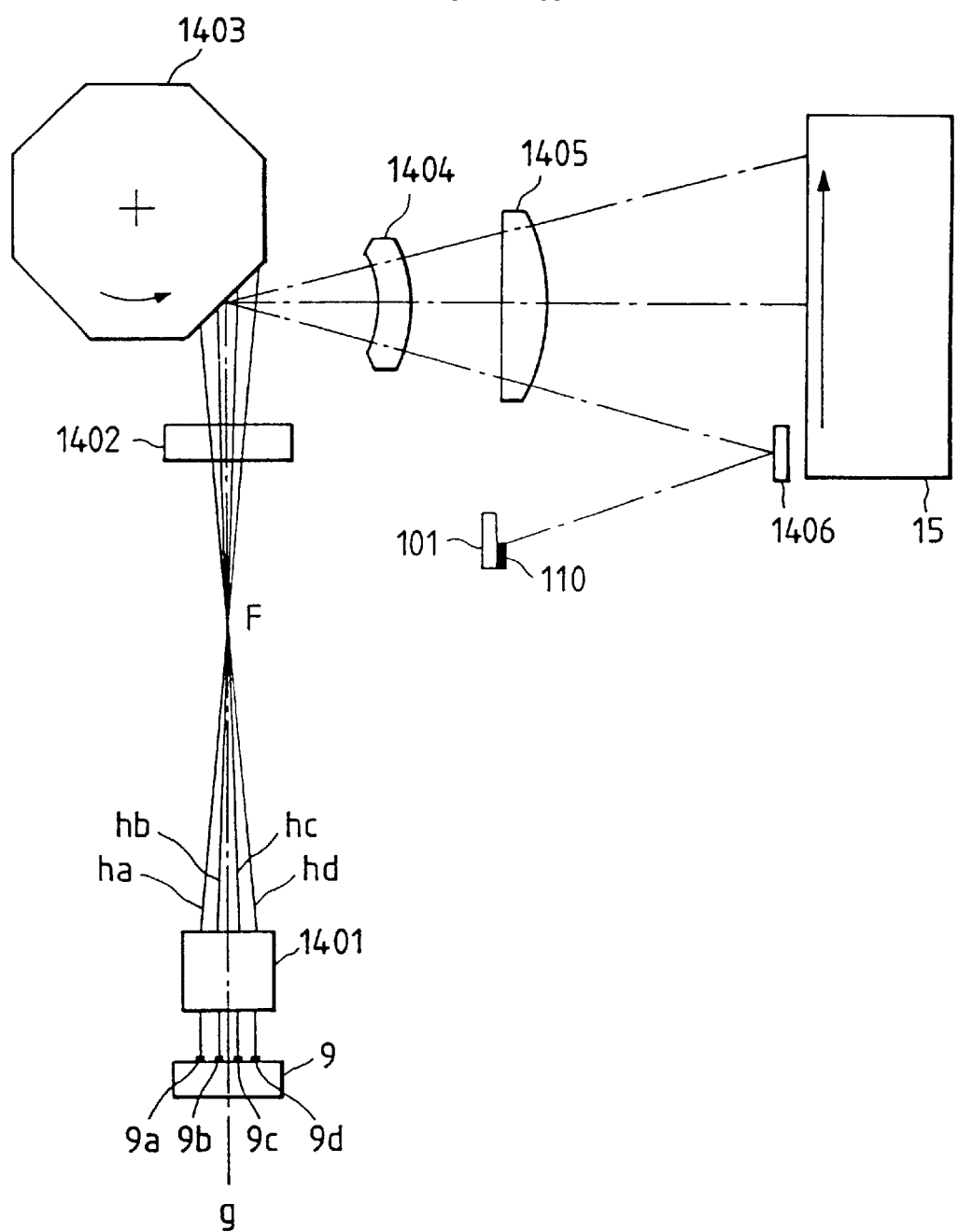
FIG. 18 shows a diagram of an optical system.

FIG. 14 shows a block diagram of an apparatus of the present embodiment, FIG. 15 shows block diagram of a beam detector and a gain controller, and FIG. 16 shows signal waveforms in FIG. 15. The same elements to those of the prior art apparatus and other embodiment are designated by the same numerals. The block diagram of the beam detector and the position detector is identical to that shown in FIG. 2 for the embodiment 1.

In order to attain laser modulation drive equivalent to laser intensity modulation in the multiple tone image forming apparatus, the laser spots B1–B4 as shown in FIG. 8 are arranged on the record medium. The laser spots B1–B4 are arranged in parallel to the main scan direction and the laser spot intensities are set to B1:B2:B3:B4=1:2:4:8.

When the laser spot B1 is irradiated to the beam detector 1, an electrical signal representing the irradiation intensity is outputted from the photo-sensing device 101 and amplified by the amplifier 102 and outputted from the beam detector 1 as a signal waveform as shown by (a) of FIG. 16. Resistors 102B–102E for determining the amplification factor of the amplifier 102 are set to a maximum amplification factor G1 because controlled switching means 103A–103C are all open. The detection signal of the beam spot B1 is inputted to the position detector 2 and differentiated by the differentiator which generates a signal waveform as shown by (b) of FIG. 16. The output signal of the differentiator 205 is inputted to the differentiator 201 and the comparator 202.

The detection signal of the beam spot B1 inputted to the differentiator 201 is differentiated by the differentiator 201 which generates a signal as shown by (d) of FIG. 16 which is inputted to the zero-cross detector 204. The zero-cross detector 204 has the detection state thereof controlled by the output signal of the comparator 202 and detects the zero-crossing of the output signal of the differentiator 201. As a result, as shown by (e) of FIG. 16, a beam position detection signal indicating the arrival of the laser beam spot B1 scanning over the record medium at the predetermined position is generated and a timing signal BT1 as shown by (f) of FIG. 16 is derived from the distributor 3.

The output signal of the timing signal BT1 is inputted to a step down circuit 402 and a delay circuit 1001 arranged in the gain controller 10. The timing signal BT1 inputted to the delay circuit 1001 is delayed by a predetermined time and outputted as a signal as shown by (j) of FIG. 16. The output signal of the delay circuit 1001 is inputted to a set input terminal of an R-S FF 1007 and an output signal of the R-S FF 1007 shown by (p) of FIG. 16 controls switch means 103A arranged in the beam detector 1 to close the switch means 103A. Thus, the amplification factor of the amplifier 102 is switched to G2 which is one half of the maximum amplification factor G1 so that the output signal representing the irradiation intensity of the laser spot B1 is rendered to ½ as shown by (a) of FIG. 16.

Similarly, the predetermined time after the detection of the arrival of the laser spot B2 and B3 at the predetermined position, the amplification factor of the amplifier 102 is rendered to G3 and G4, respectively, so that the need to increase the dynamic range of the position detector 2 is eliminated. A beam position detection signal indicating the arrival of the laser spot B4 at the predetermined position is generated and the timing signal BT4 is derived. The timing signal BT4 is inputted to multivibrators 1004 and 1005 which output logically opposite output signals of different output pulse widths as shown by (m) and (n) of FIG. 16. The output signals of the multivibrators 1004 and 1005 are ANDed by an AND circuit 1006 and an output therefrom is equivalently outputted the predetermined time later by the timing signal BT4.

The output signal of the AND circuit 1006 is inputted to reset input terminals of R-S FF 1007–1009 to reset the R-S FF 1007–1009 as shown by (p), (q) and (r) of FIG. 16. As a result, the switch means 103A–103C arranged in the beam detector 2 are opened by the output signals of the R-S FF 1007–1009 so that the amplification factor of the amplifier 102 is switched to the maximum amplification factor G1. Accordingly, at every predetermined time at which the arrival of the laser spots B1–B4 at the predetermined position, the amplification of the beam detector may be switched. The signal is then processed as it is in the embodiment 1 to form the image on the record medium.

As described above, the arrival of the laser beam spot at the predetermined position may be automatically detected without depending on the sizes of the spots scanning over the record medium and the laser intensities and the following effects are attained:

(1) Since the beam position may be detected at a high precision without depending on the timer precision of the timing signal generation circuit, the reliability of the apparatus is improved. Further, since the high precision timer is not required, the cost may be reduced.

(2) Since the position detection signal is generated for each beam in the assembling process, the adjustment time for setting the predetermined time interval is not necessary and the cost may be reduced.

(3) Since the oscillation circuit of the timing signal generation circuit is not necessary, a source of spurious radiation noise is eliminated and the reliability of the apparatus is improved. In addition, since the components to prevent the spurious radiation noise are reduced, the cost is reduced.

(4) Since the amplification factor of the beam detector is switched at each arrival of the beam spot at the predetermined position, the dynamic range of the electric circuit need not be large, the output level of the spurious radiation noise is reduced and the components to prevent the spurious radiation noise are reduced and the cost may be reduced.

(5) Since the rise times and the fall times of the beam detection signals of different laser intensities are substantially equal, the detection precision of the beam position is improved and the reliability of the apparatus is improved.

Accordingly, the reliability and the economy of the apparatus of the present invention are improved.

It should be understood that the present invention is not limited to the above embodiments but various modifications thereof may be made within the scope of the claims.

What is claimed is:

1. An image forming apparatus for simultaneously scanning a record medium by a plurality of laser beam spots, comprising:

a beam detector capable of simultaneously detecting all of the scanning laser spots;

generating means for generating a change amount signal representing a change amount, per unit time, in an output signal of said beam detector; and timing signal generating means for generating a plurality of timing signals for determining initiation of modulation of the laser beams for each line scanning in accordance with the change amount signal generated by said generating means.

2. An image forming apparatus according to claim 1, wherein said timing signal generating means includes a peak detector for detecting a peak of the change amount signal generated by said generating means.

3. An image forming apparatus according to claim 2, wherein said position detector includes a differentiator for differentiating the change detection signal and for outputting a signal having a zero-cross point at the beam position, a zero-cross detector for detecting the zero-crossing point of the signal, and a distributor for distributing the zero-crossing point of the signal outputted by said zero-cross detector and for outputting the timing signal.

4. An image forming apparatus according to claim 3, wherein said peak detector includes a comparator for comparing the change detection signal with a reference level to output a signal representing a period during which the change detection signal is higher than the reference level, wherein said zero-cross detector detects the zero-crossing point of the change detection signal during the period.

5. An image forming apparatus according to claim 3, wherein said distributor includes means for selecting one of a plurality of signal lines to be supplied to the zero-crossing point to output timing signals.

6. An image forming apparatus according to claim 1, wherein said generating means includes a differentiator for differentiating the output signal of said beam detector.

7. An image forming apparatus according to claim 1, wherein said generating means includes a delay circuit for delaying the output signal of said beam detector for a predetermined time and a subtractor for subtracting the output signal of said delay circuit from the output signal of said beam detector.

8. An image forming apparatus according to claim 1, wherein said generating means includes a filter for cutting a low frequency component of the output signal of said beam detector.

9. An image forming apparatus according to claim 1, wherein said beam detector includes a variable gain amplifier and a gain of said beam detector is controlled by said timing signals.

10. An image forming apparatus according to claim 1, wherein said beam detector includes an amplifier of variable gain, and the gain of the amplifier is set in accordance with an intensity of the laser spot to be detected.

11. An image forming apparatus according to claim 1, wherein the laser beams are arranged non-transversely to a main scan direction and the laser spot intensities are equal, or the laser spots are arranged at non-right angle with the main scan direction and the laser spot intensities are different from each other, or the laser spots are arranged in parallel to the main scan direction and the laser spot intensities are different from each other.

12. An image forming apparatus comprising:

generating means for generating a plurality of laser beams; and a polygon mirror for deflecting the plurality of laser beams so as to simultaneously scan a record medium with a plurality of laser beam spots, wherein the plurality of laser beam spots of the plurality of laser beams are arranged in parallel to the main scan direction so as to be placed in correspondence to one scanning line.

13. An image forming apparatus according to claim 12, wherein said apparatus expresses a gradation by using the plurality of laser beams.

14. An image forming apparatus according to claim 12, wherein intensities of the plurality of laser beams are different from each other such that intensity distributions of the laser spots are different from each other.

15. An image forming apparatus according to claim 14, wherein ratios of the intensities of the plurality of laser beams are $1, 2, 2^2, \ldots 2^n$, where n equals the number of laser beams.

16. An image forming apparatus according to claim 12, further comprising:

a beam detector capable of simultaneously detecting all of the scanning laser spots;

generating means for generating a change amount signal representing a change amount, per unit time, in an output signal of said beam detector; and timing signal generating means for generating a plurality of timing signals for determining initiation of modulating of the laser beams for each line scanning in accordance with the change amount signal generated by said generating means.

17. An image forming apparatus according to claim 16, wherein said generating means includes one of (a) a differentiator for differentiating the output signal of said beam detector, (b) a circuit having a delay circuit for delaying the output signal of said beam detector and a subtractor for subtracting the output signal of said delay circuit from the output signal of said beam detector, and (c) a filter for cutting a low frequency component of the output signal of said beam detector.

18. An image forming apparatus according to claim 16, wherein said detecting means includes a differentiator for differentiating a change detection signal and for outputting a signal having a zero-cross point at the beam position;

a zero-cross detector for detecting the zero-crossing point of the signal; and a distributor for distributing the zero-crossing point of the signal outputted by said zero-cross detector and for outputting the timing signals.

19. An image forming apparatus according to claim 18, wherein said distributor includes means for selecting one of a plurality of signal lines to be supplied to the zero-crossing point to output the timing signals.

20. An image forming apparatus comprising:

beam generating means for generating a plurality of laser beams, wherein the plurality of laser beams are arranged at a non-right angle with the main scan direction, and intensity distributions of laser spots cast by the laser beams are different form each other;

scanning means for simultaneously scanning a record medium with the plurality of laser beams;

a beam detector capable of simultaneously detecting all of the scanning laser spots;

first signal generating means for generating a change amount signal representing a change amount, per unit time, in an output signal of said beam detector; and second signal generating means for generating a plurality of timing signals for determining initiation of modulating of the laser beams for each line scanning in accordance with the change amount signal generated by said first signal generating means.

21. An image forming apparatus according to claim 20, wherein said first signal generating means includes one of (a) a differentiator for differentiating the output signal of said beam detector, (b) a circuit having a delay circuit for delaying the output signal of said beam detector and a subtractor for subtracting the output signal of said delay circuit from the output signal of said beam detector, and (c) a filter for cutting a low frequency component of the output signal of said beam detector.

22. An image forming apparatus according to claim 21, wherein said detecting means includes a differentiator for differentiating the change detection signal and for outputting a signal having a zero-crossing point at the beam position;

a zero-cross detector for detecting the zero-crossing point of the signal; and a distributor for distributing the zero-crossing point of the signal outputted by said zero-cross detector and for outputting the timing signals.

23. An image forming apparatus according to claim 22, wherein said distributor includes means for selecting one of a plurality of signal lines to be supplied to the zero-crossing point to output the timing signals.

* * * * *

UNITED STATES PATENT AND TRADEMARK OFFICE
CERTIFICATE OF CORRECTION

PATENT NO.    : 6,108,023
DATED         : August 22, 2000
INVENTOR(S)   : Yuzo Seino Page 1 of 1

It is certified that error appears in the above-identified patent and that said Letters Patent is hereby corrected as shown below:

<u>Column 5</u>
Line 53, "jaggi" should read -- jagging --.

<u>Column 8</u>
Line 5, "block" should read -- a block --.

<u>Column 11</u>
Line 40, "apparats" should read -- apparatus --.

<u>Column 12</u>
Line 6, "form" should read -- from --.
Line 29, "detecting" should read -- first signal generating --.

Signed and Sealed this

Seventh Day of August, 2001

*Attest:*

Nicholas P. Godici

NICHOLAS P. GODICI
*Acting Director of the United States Patent and Trademark Office*

*Attesting Officer*